(12) United States Patent
Caven et al.

(10) Patent No.: US 9,940,603 B1
(45) Date of Patent: Apr. 10, 2018

(54) SHORTAGE INDICATORS

(71) Applicant: Target Brands, Inc., Minneapolis, MN (US)

(72) Inventors: Matthew Caven, Ham Lake, MN (US); Brad Fiala, Stillwater, MN (US); Zaheer Lari, Savage, MN (US); Nikesh Suthar, Bikaner (IN); Namit Chauhan, Bangalore (IN); Siddharth Dixit, Bangalore (IN); Rituparna Chakraborty, Bangalore (IN); Atul Goel, Bangalore (IN)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 14/294,901

(22) Filed: Jun. 3, 2014

(51) Int. Cl.
*G06Q 10/00* (2012.01)
*G06Q 10/08* (2012.01)

(52) U.S. Cl.
CPC .................. *G06Q 10/087* (2013.01)

(58) Field of Classification Search
CPC .............................. G06Q 10/00; G06Q 20/18
USPC ........................................... 705/28, 26.1, 18
See application file for complete search history.

(56) References Cited

U.S. PATENT DOCUMENTS

| | | | |
|---|---|---|---|
| 7,191,142 B1 | 3/2007 | Sandell et al. | |
| 8,115,623 B1 | 2/2012 | Green | |
| 8,261,985 B2 * | 9/2012 | Chung | G07C 13/00 235/386 |
| 8,700,443 B1 * | 4/2014 | Murray | G06Q 10/087 705/7.31 |
| 8,812,337 B2 | 8/2014 | Ptak et al. | |
| 8,965,796 B1 * | 2/2015 | Gala | G06Q 20/203 705/28 |
| 9,171,300 B2 * | 10/2015 | Westby | G06Q 10/087 |
| 2001/0029405 A1 * | 10/2001 | Lipps | A61G 12/001 700/214 |
| 2002/0055942 A1 * | 5/2002 | Reynolds | G06F 21/64 |
| 2002/0087438 A1 * | 7/2002 | Kunieda et al. | 705/28 |
| 2002/0138336 A1 * | 9/2002 | Bakes | G06Q 10/087 705/28 |
| 2003/0088450 A1 * | 5/2003 | Chiu et al. | 705/8 |
| 2003/0101064 A1 * | 5/2003 | Chen et al. | 705/1 |
| 2003/0101110 A1 * | 5/2003 | Chen et al. | 705/29 |
| 2003/0105552 A1 * | 6/2003 | Lunak | B65G 1/12 700/214 |
| 2003/0177069 A1 * | 9/2003 | Joseph | 705/22 |
| 2003/0216969 A1 | 11/2003 | Bauer et al. | |

(Continued)

OTHER PUBLICATIONS

Profitect, How We Do It, Big Data in Small Bytes, http://profitect.com/how-we-do-it/, Oct. 10, 2013.

(Continued)

*Primary Examiner* — Oluseye Iwarere
(74) *Attorney, Agent, or Firm* — Merek, Blackmon & Voorhees, LLC

(57) ABSTRACT

A processor identifies that at least one value of a primary shortage metric triggers an exception to a rule. The processor retrieves a list of items that have a non-zero value for the primary shortage metric and retrieves at least one secondary shortage metric value for each item in the list of items. The processor then generates report data for a report that includes at least one item in the list of items and the values of the first and second shortage metrics for the item.

20 Claims, 20 Drawing Sheets

(56) References Cited

U.S. PATENT DOCUMENTS

| | | | |
|---|---|---|---|
| 2004/0128025 A1* | 7/2004 | Deal | 700/236 |
| 2006/0195370 A1* | 8/2006 | Howarth | G06Q 10/087 705/28 |
| 2008/0011844 A1* | 1/2008 | Tami | G07G 1/14 235/385 |
| 2008/0021936 A1* | 1/2008 | Reynolds | G06F 21/64 |
| 2008/0030345 A1* | 2/2008 | Austin | A61B 90/98 340/572.8 |
| 2008/0046344 A1* | 2/2008 | Myers | G06Q 10/00 705/28 |
| 2008/0077511 A1* | 3/2008 | Zimmerman | 705/28 |
| 2008/0243646 A1* | 10/2008 | Stein | G06Q 10/087 705/28 |
| 2008/0308632 A1 | 12/2008 | Fallin et al. | |
| 2009/0043594 A1* | 2/2009 | Tseng | 705/1 |
| 2009/0226099 A1 | 9/2009 | Kundu et al. | |
| 2009/0248198 A1* | 10/2009 | Siegel et al. | 700/231 |
| 2010/0019905 A1 | 1/2010 | Boddie et al. | |
| 2014/0316917 A1* | 10/2014 | Westby | G06Q 20/18 705/18 |
| 2015/0127478 A1* | 5/2015 | Westby | G06Q 10/087 705/26.1 |
| 2015/0178654 A1* | 6/2015 | Glasgow | G06Q 10/0875 705/7.25 |

OTHER PUBLICATIONS

Profitect, How We Deliver It, Turn Stock Data into Profit Amplification Opportunities, http://profitect.com/what-we-deliver/inventory/, Oct. 10, 2013.

Western Electric Rules—Wikipedia, http://en.wikipedia.org/wiki/Western_Electric_rules, 6 pages, Apr. 15, 2014.

U.S. Appl. No. 13/755,642, filed Jan. 31, 2013.

U.S. Appl. No. 14/328,762, filed Jul. 11, 2014.

* cited by examiner

Assets Protection 208  myShortageDashboard  102

| SUMMARY | RECEIVING | REVERSE LOGISTICS | POS | SALESFLOOR | BACKROOM | THEFT |

— 301

| | | | | | | | | | | | | | | |
|---|---|---|---|---|---|---|---|---|---|---|---|---|---|---|
| SALES$ | JAN $5,498,399 | | | | | | | | | | | YTD $78,846,560 | | |

— 224

SHORTAGE EXCEPTION SUMMARY

| | FEB | MAR | APR | MAY | JUN | JUL | AUG | SEP | OCT | NOV | DEC | JAN | YTD | RANK |
|---|---|---|---|---|---|---|---|---|---|---|---|---|---|---|
| RECEIVING | 6 | 2 | | | | | | | | | | | 8 | 5/13 |
| REVERSE LOGISTICS | 7 | 4 | | | | | | | | | | | 11 | 10/13 |
| POS | 10 | 1 | | | | | | | | | | | 11 | 6/13 |
| SALESFLOOR | 18 | 5 | | | | | | | | | | | 23 | 9/13 |
| BACKROOM | 22 | 8 | | | | | | | | | | | 30 | 11/13 |
| THEFT | 1 | 2 | | | | | | | | | | | 3 | 2/13 |
| TOTAL | 64 | 22 | | | | | | | | | | | 86 | 9/13 |
| RANK | 8/13 | 10/13 | 1/13 | 1/13 | 1/13 | 1/13 | 1/13 | 1/13 | 1/13 | 1/13 | 1/13 | 1/13 | | |

SHORTAGE  GM INVENTORY DATE - 07/14/2013

| | TY$ | TY% | LY$ | LY% | SHTG B/(P) LY% | B/(P)% | GOAL % |
|---|---|---|---|---|---|---|---|
| GM | $86,255 | 1.08% | $100,279 | 1.14% | 0.29% | 0.06% | 1.07% |
| PERISHABLE(QRTLY) | $9,012 | 2.08% | $3,525 | 1.05% | (0.67%) | (1.03%) | 88% |
| TOTAL | $95,267 | 1.04% | $103,804 | 1.03% | 1.03% | (0.01%) | 1.06% |

— 212  — 214

TOP 10 DEPT SHORTAGE — 216

| DEPT | DESCRIPTION | SHTG TY$ | SHTG TY% | SHTG B/(P) LY% | SALES | B/(P)% | SALES B/(P) LY% |
|---|---|---|---|---|---|---|---|
| 222 | COSMETICS | $5,720 | 4.08% | 0.29% | $127,798 | 0.06% | 4.12% |
| 585 | MOVIES | $3,350 | 1.83% | (0.67%) | $118,339 | 1.07% | (4.68%) |
| 512 | JEWELRY | $3,218 | 1.69% | 6.90% | $23,514 | 0.06% | 18.70% |
| 75 | PORTABLE ELECTRONICS | $3,117 | 1.05% | (0.66%) | $230,719 | (0.01%) | (15.83%) |
| 333 | CANDY | $2,714 | 1.02% | 0.05% | $222,548 | | 0.48% |
| 94 | PERSONAL CARE | $2,517 | 1.95% | 0.03% | $264,729 | | (1.08%) |
| 171 | SNACKS | $2,155 | 1.70% | (0.11%) | $307,744 | | 0.77% |
| 731 | SKIN/BATH/FRAGS. | $1,965 | 1.00% | (0.25%) | $130,615 | | (2.70%) |
| 336 | HAIR CARE | $1,928 | 3.53% | 0.04% | $126,252 | | (3.83%) |
| 774 | PHARMACY-OTC | $1,868 | 2.76% | 0.31% | $245,410 | | 6.43% |

MONTHLY SUMMARY — 218

| CATEGORY | | | | | | |
|---|---|---|---|---|---|---|
| RECEIVING | | | | | | |
| REVERSE LOGISTICS | | | | | | |
| POS | | | | | | |
| SALESFLOOR | | | | | | |
| BACKROOM | | | | | | |
| THEFT | | | | | | |

SHORTAGE COMMITMENTS — 220

| OWNER | ACTION |
|---|---|
| | |

☐ EXPORT TO SPREADSHEET — 222

FIG. 2

Assets Protection — myShortageDashboard

| SUMMARY | RECEIVING | REVERSE LOGISTICS | POS | SALESFLOOR | BACKROOM | THEFT |

1375 — 301
RECEIVING EXCEPTIONS @ 310 / 304

| | LAST UPDATE | FEB | MAR | APR | MAY | JUN | JUL | AUG | SEP | OCT | NOV | DEC | JAN | YTD | RANK |
|---|---|---|---|---|---|---|---|---|---|---|---|---|---|---|---|
| QUANTITY DISCREPANCIES | 03/08/2014 | | | | | | | | | | | | | | 1/13 |
| STORE TO STORE TRANSFERS | 03/08/2014 | 4 | 2 | | | | | | | | | | | 6 | 6/13 |
| NO RECEIPT CREATED | 03/08/2014 | 4 | 2 | | | | | | | | | | | 6 | 5/13 |
| TOTAL | | 7/13 | 3/13 | 1/13 | 1/13 | 1/13 | 1/13 | 1/13 | 1/13 | 1/13 | 1/13 | 1/13 | 1/13 | | |
| RANK | | | | | | | | | | | | | | | |

306

| DATE | EXCEPTION TYPE | STATUS | RESULTS | REASON | IMPACT |
|---|---|---|---|---|---|
| 03/08/2014 | R NO RCPT PO 5371715-WK 5 | | | | |
| 03/01/2014 | R NO RCPT PO 9850069-WK 4 | | | | |
| 03/01/2014 | R NO RCPT PO 598873-WK 4 | | | | |
| 03/01/2014 | R NO RCPT PO 581295-WK 4 | | | | |
| 02/15/2014 | R NO RCPT PO 5296486-WK 2 | | | | |
| 02/15/2014 | R NO RCPT PO 8388480-WK 2 | | | | |

308

222 ☐ EXPORT TO SPREADSHEET

FIG. 3

Assets Protection — myShortageDashboard

| SUMMARY 1375 | RECEIVING 301 | REVERSE LOGISTICS 410 | POS | SALESFLOOR | BACKROOM 222 | THEFT |
|---|---|---|---|---|---|---|

402

| | LAST UPDATE | FEB | MAR | APR | MAY | JUN | JUL | AUG | SEP | OCT | NOV | DEC | JAN | YTD | RANK |
|---|---|---|---|---|---|---|---|---|---|---|---|---|---|---|---|
| SWEEPS | 03/08/2014 | 5 | 2 | | | | | | | | | | | 2 | 6/13 |
| CRC AGING | 03/08/2014 | | | | | | | | | | | | | 3 | 1/13 |
| ENTERTAINMENT SCANS | | | | | | | | | | | | | | | 1/13 |
| VENDOR CREDITS | 03/08/2014 | 4 | 2 | | | | | | | | | | | 6 | 11/13 |
| MIR | 03/08/2014 | 2 | 2 | | | | | | | | | | | 4 | 2/13 |
| TOTAL | | 11 | 6 | | | | | | | | | | | 17 | |
| RANK | | 8/13 | 10/13 | 1/13 | 1/13 | 1/13 | 1/13 | 1/13 | 1/13 | 1/13 | 1/13 | 1/13 | 1/13 | | 10/13 |

| DATE | EXCEPTION TYPE | STATUS | RESULTS | REASON | IMPACT |
|---|---|---|---|---|---|
| 03/08/2014 | RL MIR-WK 5 | | | | |
| 03/08/2014 | RL SWEEPS 2008701-WK 5 | | | | |
| 03/08/2014 | RL VC 3758197-WK 5 | | | | |
| 03/01/2014 | RL CRC AGING-WK 4 | | | | |
| 03/01/2014 | RL MIR-WK 4 | | | | |
| 03/01/2014 | RL VC 3758197-WK 4 | | | | |
| 02/22/2014 | RL CRC AGING-WK 3 | | | | |

FIG. 4

Assets Protection — myShortageDashboard

| SUMMARY | RECEIVING | REVERSE LOGISTICS | POS | SALESFLOOR | BACKROOM | THEFT |
|---|---|---|---|---|---|---|
| 1375 | 301 — 510 | 504 | | 502 | 222 | EXPORT TO SPREADSHEET |

| | LAST UPDATE | FEB | MAR | APR | MAY | JUN | JUL | AUG | SEP | OCT | NOV | DEC | JAN | YTD | RANK |
|---|---|---|---|---|---|---|---|---|---|---|---|---|---|---|---|
| UNIDENTIFIED SALES | 03/08/2014 | 4 | | | | | | | | | | | | 4 | 7/13 |
| ONLINE RETURNS | 03/08/2014 | 6 | 2 | | | | | | | | | | | 8 | 4/13 |
| VOIDS | 03/08/2014 | 4 | 2 | | | | | | | | | | | 6 | 2/13 |
| TOTAL | | 14 | 4 | | | | | | | | | | | 16 | |
| RANK | | 6/13 | 1/13 | 1/13 | 1/13 | 1/13 | 1/13 | 1/13 | 1/13 | 1/13 | 1/13 | 1/13 | 1/13 | | 6/13 |

| DATE | EXCEPTION TYPE | STATUS | RESULTS | REASON | IMPACT |
|---|---|---|---|---|---|
| 03/08/2014 | P ONLINE-WK 5 | | | | |
| 03/08/2014 | P VOIDS-WK 5 | | | | |
| 03/01/2014 | P ONLINE-WK 4 | | | | |
| 03/01/2014 | P VOIDS-WK 4 | | | | |
| 02/22/2014 | P ONLINE-WK 3 | | | | |
| 02/22/2014 | P UNID-WK 5 | | | | |
| 02/22/2014 | P VOIDS-WK 5 | | | | |
| 02/15/2014 | P ONLINE-WK 2 | | | | |

Assets Protection — 102 — myShortageDashboard — 701

| SUMMARY | RECEIVING | REVERSE LOGISTICS | POS | SALESFLOOR | BACKROOM | THEFT |
|---|---|---|---|---|---|---|
| 1375 — 301 — 710 — 704 | | | | | 702 — 222 | ☐ EXPORT TO SPREADSHEET |

| | LAST UPDATE | FEB | MAR | APR | MAY | JUN | JUL | AUG | SEP | OCT | NOV | DEC | JAN | YTD | RANK |
|---|---|---|---|---|---|---|---|---|---|---|---|---|---|---|---|
| BAFFLES | 03/08/2014 | 9 | 4 | | | | | | | | | | | 13 | 9/13 |
| GHOSTS | 03/08/2014 | 13 | 5 | | | | | | | | | | | 18 | 13/13 |
| ITEM MERGE | 03/08/2014 | 4 | | | | | | | | | | | | 4 | 3/13 |
| TOTAL | | 26 | 9 | | | | | | | | | | | 35 | |
| RANK | | 10/13 | 12/13 | 1/13 | 1/13 | 1/13 | 1/13 | 1/13 | 1/13 | 1/13 | 1/13 | 1/13 | 1/13 | | 11/13 |

| DATE | EXCEPTION TYPE | STATUS | RESULTS | REASON | IMPACT |
|---|---|---|---|---|---|
| 03/08/2014 | BR BAFFLE-BEAUTY-WK 5 | | | | |
| 03/08/2014 | BR BAFFLE-ELEC-WK 5 | | | | |
| 03/08/2014 | BR BAFFLE-HEALTH-WK 5 | | | | |
| 03/08/2014 | BR GHOST-BEAUTY-WK 5 | | | | |
| 03/08/2014 | BR GHOST-ELEC-WK 5 | | | | |
| 03/08/2014 | BR GHOST-ENT-WK 5 | | | | |
| 03/08/2014 | BR GHOST-HEALTH-WK 5 | | | | |
| 03/01/2014 | BR BAFFLE-BEAUTY-WK 4 | | | | |
| 03/01/2014 | BR BAFFLE-HEALTH-WK 4 | | | | |

| SUMMARY | RECEIVING | REVERSE LOGISTICS | POS | SALESFLOOR | BACKROOM | THEFT |

Assets Protection — myShortageDashboard — 102 — 801 — 802

1375 — 301 — 810 — 804 — 222 — EXPORT TO SPREADSHEET

| | LAST UPDATE | FEB | MAR | APR | MAY | JUN | JUL | AUG | SEP | OCT | NOV | DEC | JAN | YTD | RANK |
|---|---|---|---|---|---|---|---|---|---|---|---|---|---|---|---|
| EMPTY PACKAGES | 03/08/2014 | | 2 | | | | | | | | | | | 2 | 1/13 |
| TCM INCIDENTS | 03/08/2014 | 3 | 2 | | | | | | | | | | | 3 | 8/13 |
| TOTAL | | | | | | | 1/13 | | 1/13 | 1/13 | 1/13 | 1/13 | 1/13 | 5 | 2/13 |
| RANK | | 10/13 | 6/13 | | | | | | | | | | | | |

| DATE | EXCEPTION TYPE | STATUS | CAMERAS | MERCHANDISE PROTECTION | PERPETUAL INVENTORY | RESULTS |
|---|---|---|---|---|---|---|
| 03/08/2014 | T EP D4-WK 5 | | | | | |
| 03/08/2014 | T TCM D2-WK 4 | | | | | |
| 03/08/2014 | T TCM D6-WK 3 | | | | | |

806 — 809 — 808 — 800

STORE: A111
COUNT UPDATES - WEEK 3, 2014

DEPARTMENT EXCEPTION

| DEPT | DESCRIPTION | EXCEPTION PERIOD | LY AVG.CU$ | AVG. CU$ OVER EXCEPTION PERIOD | AVG. SALES OVER EXCEPTION PERIOD | AVG. CU% OVER EXCEPTION PERIOD |
|---|---|---|---|---|---|---|
| 2A | TOYS | 3 WEEK | ($270.18) | ($51.26) | $627.00 | -8.17% |

CLASS DETAIL

| DEPT | CLASS | DESCRIPTION | TOTAL CU$ OVER 8 WEEKS | TOTAL CU$ OVER EXCEPTION PERIOD | TOTAL CU QTY OVER 8 WEEKS | TOTAL CU QTY OVER EXCEPTION PERIOD |
|---|---|---|---|---|---|---|
| 2A | 71 | CONSTRUCTION | ($120.97) | ($115.00) | -102 | -18 |
| 2A | 1 | BLOCKS | ($111.57) | ($111.57) | -42 | -12 |
| 2A | 4 | EDUCATION TOYS | ($99.48) | ($99.48) | -21 | -3 |
| 2A | 91 | INFANT/TODDLER | ($64.02) | ($64.02) | -47 | -15 |
| 2A | 23 | BLOCKS | ($111.57) | ($111.57) | -3 | 0 |

TOP 25 ITEMS

| DEPT | CLASS | ITEM | DESCRIPTION | Retail $ | TOT. CU$ OVER 8 WKS. | TOT. CU$ OVER EXC. PER. | TOT. CU QTY OVER 8 WKS. | TOT. CU QTY OVER EXC. PER. | TOT. THEFT QTY | TOT. EP QTY | TOT. RCPT QTY DIFF | TOT. CRC AGING QTY | TOT. SWEEP QTY DIFF | ITEM MERGE QTY | GHOSTS (Y/N) | BAFFLES (Y/N) |
|---|---|---|---|---|---|---|---|---|---|---|---|---|---|---|---|---|
| 2A | 4 | 2351 | FAMILY TABLET | $2.99 | ($59.94) | ($49.95) | -6 | -5 | - | - | - | - | - | 5 | - | - |
| 2A | 1 | 2362 | ICE CREAM MACH. | $2.99 | ($17.94) | ($17.94) | -9 | -6 | 3 | - | - | - | - | - | - | - |
| 2A | 71 | 8 | WATCH ASST | $1.99 | ($17.91) | ($17.91) | -9 | -9 | - | 5 | - | - | - | - | - | - |
| 2A | 71 | 7916 | WATCH | $1.99 | ($1.94) | ($11.94) | -6 | -6 | - | - | - | - | - | - | - | - |
| 2A | 1 | 5714 | FIRE STATION | $9.99 | ($9.99) | ($9.99) | -1 | -1 | - | - | - | - | - | - | - | - |
| 2A | 71 | 12 | WATCH ASST | $1.99 | ($7.96) | ($7.96) | -4 | -4 | - | 4 | - | - | - | - | - | - |
| 2A | 1 | 54 | SUPER HEROES | $1.29 | ($7.74) | ($7.74) | -6 | -3 | - | - | - | - | - | - | - | - |
| 2A | 91 | 6 | VEHICLES | $2.29 | ($6.87) | ($6.87) | -3 | -3 | - | - | - | 2 | - | - | - | - |
| 2A | 91 | 99 | ACTIVITY WALKER | $2.74 | ($16.44) | ($5.48) | -6 | -2 | - | - | - | - | - | - | - | - |
| 2A | 91 | 5371 | ELECTRONICS | $2.41 | ($4.82) | ($4.82) | -2 | -2 | - | - | - | 2 | - | - | - | - |
| 2A | 4 | 415 | SMART PK RECHARG | $4.39 | ($4.39) | ($4.39) | -1 | -1 | - | 4 | - | - | - | - | - | - |
| 2A | 91 | 97 | KEYS | $1.09 | ($4.36) | ($4.36) | -4 | -4 | - | - | - | - | - | - | - | - |
| 2A | 1 | 2382 | TOY FIGURINE | $2.99 | ($2.99) | ($2.99) | -1 | -1 | - | - | - | - | - | - | - | - |
| 2A | 1 | 56 | CARS | $2.19 | ($2.19) | ($2.19) | -1 | -1 | - | - | - | - | - | - | - | - |
| 2A | 91 | 9116 | PLUSH DOG | $1.99 | ($1.99) | ($1.99) | -1 | -1 | - | - | 2 | - | - | - | - | - |
| 2A | 91 | 987 | TRAILER/CAR CARRIER | $99.99 | ($199.98) | ($199.98) | -2 | -2 | - | - | - | - | - | - | - | - |
| 2A | 91 | 336 | STUFFED ANIMAL | $1.64 | ($1.64) | ($1.64) | -1 | -1 | - | - | - | - | - | - | - | - |
| 2A | 91 | 9114 | PLUSH DOG | $.99 | ($.99) | ($.99) | -1 | -1 | - | - | - | - | 1 | - | - | - |
| 2A | 23 | 2471 | WATER TABLE | $3.49 | ($3.49) | $0.00 | -1 | -1 | - | - | - | - | - | - | - | - |
| 2A | 23 | 2362 | STUFFED ANIMAL | $.59 | ($1.77) | $0.00 | -3 | -3 | - | - | - | - | - | - | - | - |
| 2A | 91 | 132 | JIGSAW PUZZLE ASST | $.99 | ($4.95) | $0.00 | -5 | -5 | - | - | - | - | - | - | - | - |
| 2A | 91 | 134 | PEG PUZZLE ASST | $.79 | ($2.37) | $0.00 | -3 | -3 | - | - | - | - | - | - | - | - |
| 2A | 23 | 219 | PLANE | $3.99 | ($3.99) | $0.00 | -1 | -1 | - | - | - | - | - | - | - | - |
| 2A | 91 | 88 | PUZZLE ASST | $.99 | ($3.96) | $0.00 | -4 | -4 | - | - | - | - | - | - | - | - |
| 2A | 23 | 21 | TOY FIGURINE | $3.99 | ($7.98) | $0.00 | -2 | -2 | - | - | - | - | - | - | - | - |

FIG. 9

STORE: A111
EMPTY PACKAGES - WEEK 2, 2014    1002

DEPARTMENT EXCEPTION

| DEPT | DESCRIPTION | EXCEPTION PERIOD | LY AVG.EP$ | AVG.EP$ OVER EXCEPTION PERIOD |
|---|---|---|---|---|
| 99C | JEWELRY | 3 WEEK | $11.43 | $28.43 |

1004

CLASS DETAIL

| DEPT | CLASS | DESCRIPTION | TOTAL EP$ OVER 8 WEEKS | TOTAL EP$ OVER EXCEPTION PERIOD | TOTAL EP QTY OVER 8 WEEKS | TOTAL EP QTY OVER EXCEPTION PERIOD |
|---|---|---|---|---|---|---|
| 99C | 44 | CLASSIC JEWELRY | $118.43 | $118.43 | 58 | 30 |
| 99C | 77 | CONTEMPORARY JEWELRY | $38.12 | $38.12 | 30 | 23 |
| 99C | 01 | GIRLS JEWELRY | $7.95 | $7.95 | 5 | 1 |
| 99C | 110 | JUNIOR | $2.08 | $2.08 | 1 | 1 |

TOP 25 ITEMS

| DEPT | CLASS | ITEM | DESCRIPTION | Retail$ | TOT. EP$ OVER 8 WKS. | TOT. EP$ OVER EXC. PER. | TOT. EP QTY OVER 8 WKS. | TOT. EP QTY OVER EXC. PER. | TOT. THEFT QTY | TOT. CU QTY | TOT. CRC AGING QTY |
|---|---|---|---|---|---|---|---|---|---|---|---|
| 99C | 44 | 54 | FINE JEWELRY | $19.99 | $59.97 | $59.97 | 3 | 3 | - | -3 | - |
| 99C | 77 | 75 | FASHION NECKLACE | $16.99 | $50.97 | $50.97 | 3 | 3 | 2 | -3 | - |
| 99C | 44 | 766 | FINE JEWELRY BRACEL | $39.99 | $79.98 | $39.99 | 3 | 1 | - | -1 | - |
| 99C | 44 | 721 | FINE JEWELRY NECKLA | $39.99 | $159.96 | $39.99 | 4 | 1 | - | -6 | - |
| 99C | 44 | 785 | FINE JEWELRY BRACEL | $39.99 | $39.99 | $39.99 | 1 | 1 | - | -4 | - |
| 99C | 44 | 112 | FINE JEWELRY EARRIN | $19.99 | $39.98 | $39.98 | 2 | 2 | - | -2 | 2 |
| 99C | 44 | 135 | LG RND CLEAR STUD | $19.99 | $39.98 | $39.98 | 2 | 2 | - | -5 | - |
| 99C | 77 | 442 | FASHION NECKLACE | $16.99 | $33.98 | $33.98 | 2 | 2 | - | -10 | - |
| 99C | 77 | 1352 | FASHION BRACELET | $16.99 | $33.98 | $33.98 | 2 | 2 | - | -2 | - |
| 99C | 44 | 558 | FINE JEWELRY EARRIN | $14.99 | $29.98 | $29.98 | 2 | 2 | - | - | - |
| 99C | 77 | 433 | FASHION NECKLAS | $11.88 | $23.76 | $23.79 | 2 | 2 | - | - | - |
| 99C | 44 | 432 | FASHION EARRINGS | $10.00 | $20.00 | $20.00 | 2 | 2 | - | - | - |
| 99C | 44 | 775 | FASHION NECKLACE | $19.99 | $19.99 | $19.99 | 1 | 1 | - | -1 | - |
| 99C | 44 | 4488 | FASHION BRACELET | $19.99 | $19.99 | $19.99 | 1 | 1 | - | -1 | - |
| 99C | 44 | 1335 | FINE JEWELRY EARRIN | $19.99 | $19.99 | $19.99 | 1 | 1 | - | -1 | - |
| 99C | 44 | 4645 | FINE JEWELRY EARRIN | $19.99 | $19.99 | $19.99 | 1 | 1 | - | -1 | - |

FIG. 10

STORE: A111
TCM INCIDENTS – WEEK 4, 2014

DEPARTMENT EXCEPTION 1102

| DEPT | DESCRIPTION | EXCEPTION PERIOD | LY AVG. THEFT$ | AVG. THEFT$ OVER EXCEPTION PERIOD |
|---|---|---|---|---|
| 65m | COLLECTION BEDDING | 1 WEEK | $7.90 | $23.94 |

CLASS DETAIL 1104

| DEPT | CLASS | DESCRIPTION | TOTAL THEFT$ OVER 8 WEEKS | TOTAL THEFT$ OVER EXCEPTION PERIOD | TOTAL THEFT QTY OVER 8 WEEKS | TOTAL THEFT QTY OVER EXC. PER. | RESOLUTION INTERNALS $ | RESOLUTION EXTERNALS $ | PREVENTION $ | INTELLIGENCE $ |
|---|---|---|---|---|---|---|---|---|---|---|
| 65m | 30 | LICENSE | $2.99 | $2.99 | 1 | 1 | $0.00 | $0.00 | $21.99 | $0.00 |
| 65m | 150 | QUILTS | $19.97 | $19.97 | 3 | 3 | $0.00 | $0.00 | $119.97 | $0.00 |
| 65m | 140 | BEDSKIRTS | $1.99 | $1.99 | 1 | 1 | $0.00 | $0.00 | $12.99 | $0.00 |
| 65m | 170 | DUVET COVERS | $7.99 | $7.99 | 1 | 1 | $0.00 | $0.00 | $79.99 | $0.00 |

TOP 25 ITEMS 1106

| DEPT | CLASS | ITEM | DESC. | Retail$ | TOT. THEFT$ OVER 8 WKS. | TOT. THEFT$ OVER EXC. PER. | TOT. THEFT QTY OVER 8 WKS. | TOT. THEFT QTY OVER EXC. PER. | RES. INT.$ | RES. EXT.$ | PREV.$ | INTELL.$ | TOT. EP QTY | TOT. CU QTY | TOT. RPT QTY DIFF | TOT. NO RCPT QTY | TOT. CRC AGING QTY | GHOSTS (Y/N) |
|---|---|---|---|---|---|---|---|---|---|---|---|---|---|---|---|---|---|---|
| 65m | 170 | 6669 | KING | $7.99 | $7.99 | $7.99 | 1 | 1 | $0.00 | $0.00 | $7.99 | $0.00 | - | -6 | - | - | - | n |
| 65m | 150 | 0202 | STD. SHAM | $1.99 | $3.98 | $3.98 | 2 | 2 | $0.00 | $0.00 | $3.98 | $0.00 | 5 | -3 | - | - | 2 | n |
| 65m | 150 | 1444 | K QUILT | $7.99 | $7.99 | $7.99 | 1 | 1 | $0.00 | $0.00 | $7.99 | $0.00 | - | -8 | 8 | - | - | n |
| 65m | 30 | 6659 | T SHEET SET | $2.99 | $2.99 | $2.99 | 1 | 1 | $0.00 | $0.00 | $2.99 | $0.00 | - | -20 | - | - | - | Y |
| 65m | 140 | 5857 | T BEDSKIRT | $1.99 | $1.99 | $1.99 | 1 | 1 | $0.00 | $0.00 | $1.99 | $0.00 | - | -6 | - | 6 | - | n |

FIG. 11

STORE: A111
GHOST EXCEPTION - WEEK 2, 2014

| DEPT | CLASS | ITEM | ITEM DESCRIPTION | Retail $ | STOCK ROOM | ADD TO LOC DATE | ADD TO LOC TIME | GHOST DATE | GHOST TIME | TOTAL THEFT QTY | TOTAL EP QTY | TOTAL CU QTY | ITEM MERGE QTY | BAFFLES (Y/N) |
|---|---|---|---|---|---|---|---|---|---|---|---|---|---|---|
| 18A | 100 | 132 | ELECTRONIC | $499.99 | 01E001D42 | | 0:00 | 2/11/2014 | 12:40 | | | -6 | - | N |
| p99 | 300 | 88 | STARTER PAK | $75.00 | 99E001606 | 2/10/2014 | 0:45 | 2/13/2014 | 1:23 | 1 | | - | - | N |
| p99 | 280 | 222 | VIDEO GAME | $59.99 | 018014F28 | 2/12/2014 | 0:52 | 2/12/2014 | 4:52 | | | - | - | N |
| p99 | 280 | 29 | SOFTWARE | $39.99 | 99E001I40 | 2/12/2014 | 5:03 | 2/13/2014 | 4:12 | | PART | 1 | - | Y |
| 18A | 05 | 258 | SPEAKER | $39.99 | 01E003D34 | | 0:00 | 2/10/2014 | 4:09 | | | - | - | N |
| 18A | 11 | 81 | HEADPHONES | $20.79 | 99E001I33 | 2/6/2014 | 5:34 | 2/13/2014 | 16:18 | | | - | - | N |
| p99 | 22 | 14 | VIDEO GAME | $19.99 | 99E001634 | 2/7/2014 | 5:41 | 2/13/2014 | 1:40 | | | - | - | N |
| 18A | 23 | 26 | BATTERIES | $13.19 | 99E001F30 | 2/11/2014 | 6:16 | 2/11/2014 | 12:13 | | 1 | - | - | N |
| 18A | 23 | 41 | BATTERIES | $12.19 | 99E001D42 | 2/7/2014 | 4:07 | 2/14/2014 | 12:12 | | | - | 5 | N |
| 18A | 23 | 31 | BATTERIES | $10.89 | 99E001F32 | 2/7/2014 | 4:47 | 2/13/2014 | 12:13 | | | - | - | N |

STOCKROOM ACTIVITY DETAIL

| STOCKROOM | DEPT | CLASS | ITEM | ITEM DESCRIPTION | SCAN DATE | SCAN TIME | LAST NAME | EMPLOYEE # | REC TYPE | TRAN TYPE | PULL TYPE | PULL QTY |
|---|---|---|---|---|---|---|---|---|---|---|---|---|
| 01B014E28 | 2 | 21 | 145 | EYE GLASSES | 2/12/2014 | 4:52 | SMITH | 4587 | PULL | ADD | | 0 |
| 01E001D42 | 18A | 2 | 325 | ELECTRONICS | 1/15/2014 | 11:52 | JONES | 0214 | STO | ADD | | 0 |
| | 18A | 42 | 135 | ELECTRONICS | 1/16/2014 | 4:40 | ADAMS | 1147 | PULL | PART | AUTO | 1 |
| | 18A | 2 | 235 | ELECTRONICS | 1/23/2014 | 7:07 | WASHINGTON | 3587 | PULL | PART | POGR | 1 |
| 01E003D34 | 18A | 21 | 235 | ELECTRONICS | 2/6/2014 | 4:23 | PITT | 65 | PULL | PART | AUTO | 1 |
| | 56 | 7 | 251 | CELLPHONE ACC | 1/15/2014 | 11:53 | JONES | 2258 | STO | ADD | | 0 |
| | 40 | 9 | 33 | SOFTWARE | 2/6/2014 | 22:43 | KENNEDY | 8784 | PULL | PART | POGN | 1 |
| | 18A | 8 | 41 | BATTERIES | 2/7/2014 | 4:27 | STEWART | 6699 | STO | | | 0 |
| | 18A | 8 | 42 | BATTERIES | 2/12/2014 | 5:36 | LINCOLN | 654 | STO | ADD | | 0 |
| 99E001D42 | 18A | 8 | 37 | BATTERIES | 2/12/2014 | 5:36 | LINCOLN | 654 | STO | ADD | | 0 |
| | 18A | 8 | 37 | BATTERIES | 2/12/2014 | 5:42 | LINCOLN | 654 | STO | ADD | | 0 |
| 99E001F30 | 18A | 8 | 73 | BATTERIES | 2/11/2014 | 5:52 | PITT | 3321 | PULL | PART | AUTO | 1 |
| 99E001F32 | 18A | 8 | 38 | BATTERIES | 2/13/2014 | 13:03 | ANDREWS | 6568 | PULL | PART | SCAF | 2 |
| | 18A | 8 | 55 | BOOK | 2/7/2014 | 6:56 | TRAPP | 887 | STO | ADD | | 0 |
| 99E001606 | 41 | 55 | 369 | CHARGER | 2/10/2014 | 6:15 | FLYNN | 8987 | PULL | ADD | | 0 |
| | p99 | 21 | 33 | ELEC FIGURINE | 2/13/2014 | 1:22 | PLATT | 567 | PULL | ADD | | 0 |
| | p99 | 21 | 11 | GAME CONSOLE | 3/13/2014 | 1:22 | PLATT | 567 | STO | ADD | | 0 |
| | p99 | 7 | 3 | ELEC FIGURINE | 2/7/2014 | 5:41 | LINCOLN | 654 | STO | ADD | | 0 |
| | p99 | 8 | 630 | MEMORY CARD | 2/7/2014 | 6:09 | LINCOLN | 654 | STO | ADD | | 0 |
| | 25 | 9 | 34 | STYLUS | 2/7/2014 | 6:30 | LINCOLN | 654 | STO | ADD | | 0 |
| | p99 | 21 | 5 | VIDEO GAME | 2/7/2014 | 6:02 | LINCOLN | 654 | STO | ADD | | 0 |
| | p99 | 8 | 81 | VIDEO GAME | 2/7/2014 | 5:41 | LINCOLN | 654 | STO | ADD | | 0 |
| 99E001634 | p99 | 8 | 14 | ELECTRONICS | 2/7/2014 | 5:55 | LINCOLN | 654 | STO | ADD | | 0 |
| | p99 | 23 | 53 | STYLUS | 2/7/2014 | 5:45 | LINCOLN | 654 | STO | ADD | | 0 |
| | p99 | 23 | 20 | VIDEO GAME | 2/12/2014 | 5:41 | LINCOLN | 654 | STO | ADD | | 0 |
| | p99 | 8 | 69 | VIDEO GAME | 2/12/2014 | 4:59 | TRAPP | 887 | STO | ADD | | 0 |
| | p99 | 21 | 5 | VIDEO GAME | 2/13/2014 | 1:38 | PLATT | 567 | PULL | | POGR | 1 |

FIG. 12

STORE: A111
BAFFLES EXCEPTION - WEEK 2, 2014

| DEPT | CLASS | ITEM | ITEM DESCRIPTION | RETAIL $ | DATE | TIME | STOCKROOM LOC | LAST NAME | EMP# | TOTAL CU QTY | ITEM MERGE QTY | GHOSTS (Y/N) |
|---|---|---|---|---|---|---|---|---|---|---|---|---|
| 630 | 500668 | 1457 | HAIR COLOR | $6.59 | 2/9/2014 | 4:30 | 01A011B25 | JONES | 45 | | | N |
| 637 | 26666 | 313 | COCONUT BODY SCRUB | $12.99 | 2/9/2014 | 5:33 | 01A010G25 | JONES | 45 | | | N |
| 465 | 787 | 4 | NAIL POLISH | $2.40 | 2/9/2014 | 5:47 | 01A010G42 | JONES | 45 | | | N |
| 465 | 126666 | 7 | MAKEUP SPONGE | $4.99 | 2/9/2014 | 5:48 | 01A010G42 | JONES | 45 | | | N |
| 465 | 500 | 24 | BROW TRIM/SHAPE | $3.99 | 2/9/2014 | 5:48 | 01A010G42 | JONES | 45 | | | N |
| 465 | 500 | 40 | ACETONE NPR | $0.97 | 2/9/2014 | 5:55 | 01A010I32 | JONES | 45 | | | N |
| 465 | 66 | 124 | CONCEALER | $1.00 | 2/9/2014 | 6:31 | 01A010Q33 | JONES | 45 | | | N |
| 630 | 500668 | 318 | NRSHNG OIL SH | $4.66 | 2/9/2014 | 14:13 | 01A011B02 | WRIGHT | 245 | -1 | | N |
| 465 | 500 | 40 | ACETONE NPR | $0.97 | 2/10/2014 | 4:25 | 01A010A01 | SMITH | 111 | | | N |
| 630 | 500668 | 406 | VOLUME COND | $3.99 | 2/10/2014 | 4:26 | 01A011B25 | SMITH | 111 | | | N |
| 989 | 855 | 17 | COLOR REPLACEMENT | $11.38 | 2/10/2014 | 5:05 | 01A01A42 | SMITH | 111 | | | N |
| 989 | 69 | 70 | DEEP CLEAN FLOSS | $6.39 | 2/10/2014 | 5:45 | 01A011C39 | SMITH | 111 | | | N |
| 989 | 69 | 192 | ORAL WHITENING ASST | $233.82 | 2/10/2014 | 5:54 | 01A011G10 | SMITH | 111 | | | N |
| 989 | 69 | 135 | ORAL WHITENING ASST | $131.01 | 2/10/2014 | 5:54 | 01A011G10 | SMITH | 111 | | | N |
| 989 | 11 | 110 | DEODORANT ASST | $16.59 | 2/10/2014 | 5:58 | 01A011I08 | SMITH | 111 | | | N |
| 465 | 14 | 117 | NAIL POLISH | $6.99 | 2/10/2014 | 10:28 | 01A010M40 | SMITH | 111 | | | N |
| 465 | 14 | 14 | MASCARA | $4.99 | 2/10/2014 | 10:28 | 01A010M40 | SMITH | 111 | | | N |
| 465 | 17 | 660 | LIP GLOSS | $6.99 | 2/10/2014 | 10:34 | 01A010O34 | SMITH | 111 | | | N |
| 637 | 8 | 09 | BODY OIL | $13.29 | 2/10/2014 | 15:27 | 01A010A27 | ADAMS | 554 | -5 | | Y |
| 465 | 500668 | 131 | FOUNDATION | $11.99 | 2/11/2014 | 4:17 | 01A011K36 | WICK | 699 | | | N |
| 630 | 500668 | 4635 | SHAMPOO | $18.50 | 2/11/2014 | 12:05 | 01A011H25 | WELLS | 877 | 1 | | N |
| 630 | 3337 | SHAMPOO | | $18.99 | 2/11/2014 | 12:06 | 01A011H25 | WELLS | 877 | | | N |
| 637 | 1500668 | 59 | DRY SKIN CREAM | $5.89 | 2/12/2014 | 4:10 | 01A010A32 | TOMS | 987 | | | N |
| 989 | 500 | 16 | RAZORS | $7.99 | 2/12/2014 | 4:57 | 01A010Q36 | TOMS | 987 | | | Y |
| 989 | 266660 | 13 | POMADE | $45.99 | 2/12/2014 | 7:45 | 01A011B40 | TOMS | 987 | | | Y |
| 630 | 500668 | 226 | SHAMPOO | $4.99 | 2/13/2014 | 4:10 | 01A011F32 | WEST | 888 | | | N |
| 989 | 500 | 6 | RAZORS | $3.44 | 2/13/2014 | 7:15 | 01A011Q44 | WEST | 888 | | | Y |
| 989 | 11 | 113 | DEODORANT | $14.99 | 2/13/2014 | 7:18 | 01A011Q02 | WEST | 888 | | | N |
| 465 | 110 | 12 | HAIR TRIMMER | $3.99 | 2/13/2014 | 7:20 | 01A011C01 | WEST | 888 | | | N |
| 465 | 500 | 176 | NAIL POLISH | $2.39 | 2/13/2014 | 7:44 | 01A011G09 | WEST | 888 | | | N |
| 630 | 500668 | 313 | CONDITIONER | $6.59 | 2/13/2014 | 7:46 | 01A011R01 | WEST | 888 | | | N |
| 637 | 11 | 60 | TOOTHBRUSH | $4.59 | 2/13/2014 | 7:55 | 01A011A45 | WEST | 888 | 6 | | N |
| 989 | 11 | 141 | DEODORANT | $3.99 | 2/13/2014 | 8:21 | 01A011E06 | WEST | 888 | | | N |
| 989 | 500 | 56 | DRY SKIN GEL | $5.79 | 2/13/2014 | 8:34 | 01A011M38 | WEST | 888 | | | N |
| 989 | 266660 | 6 | SHAMPOO | $10.29 | 2/13/2014 | 8:637 | 01A011G02 | WEST | 888 | | | Y |
| 637 | 1500668 | 2365 | FACIAL CLEANSING WIP | $0.98 | 2/13/2014 | 8:45 | 01A010I28 | WEST | 888 | | | N |
| 465 | 500 | 280 | EYELASH CURLER | $5.89 | 2/14/2014 | 4:45 | 01A010G36 | NORTH | 555 | | | N |
| 465 | 500 | 246 | NAIL POLISH | $2.39 | 2/14/2014 | 4:46 | 01A010G41 | NORTH | 555 | | | N |
| 630 | 500668 | 329 | CONDITIONER | $14.19 | 2/14/2014 | 4:46 | 01A010G41 | NORTH | 555 | | | N |
| 465 | 8 | 20 | EYELINER | $4.24 | 2/14/2014 | 4:50 | 01A010M465 | NORTH | 555 | | | N |
| 465 | 19 | 33 | FOUNDATION | $14.19 | 2/14/2014 | 4:465 | 01A010Q35 | NORTH | 555 | | | Y |
| 637 | 1500668 | 66 | MAKEUP REMOVER | $4.19 | 2/14/2014 | 5:02 | 01A010A01 | NORTH | 555 | -14 | | N |
| 989 | 500 | 129 | RAZORS | $12.99 | 2/14/2014 | 6:36 | 01A011C02 | JACKSON | 656 | | | N |
| 989 | 11 | 65 | DEODORANT | $8.19 | 2/14/2014 | 6:36 | 01A011C02 | JACKSON | 656 | | | N |
| 989 | 500 | 457 | RAZORS | $5.99 | 2/14/2014 | 6:637 | 01A011C02 | JACKSON | 656 | | | N |

FIG. 13

SHORTAGE INDICATORS

BACKGROUND

In retail environments, inventory tracking is used to monitor the movement of products from vendors to distribution centers and stores and finally to customers. One aspect of inventory tracking is comparing the quantity of products at a location to the quantity of products expected to be at that location. The difference between the number of products within a retail facility and the number of products expected to be in the retail facility is referred to as shortage.

The discussion above is merely provided for general background information and is not intended to be used as an aid in determining the scope of the claimed subject matter. The claimed subject matter is not limited to implementations that solve any or all disadvantages noted in the background.

SUMMARY

A processor identifies that at least one value of a primary shortage metric triggers an exception to a rule. The processor retrieves a list of items that have a non-zero value for the primary shortage metric and retrieves at least one secondary shortage metric value for each item in the list of items. The processor then generates report data for a report that includes at least one item in the list of items and the values of the first and second shortage metrics for the item.

In a further embodiment, a processor performs steps of receiving a selection of a store that is part of a retail enterprise and retrieving a list of items, each item in the list of items having a shortage metric value that contributed to an exception to a rule at the selected store. The list of items is provided to a display together with the shortage metric value of each item in the list and at least one additional shortage metric value for each item in the list.

In a further embodiment, a computer-implemented method is provided in which a request to display shortage values for a store is received and a displayable page is returned. The displayable page includes a list of items that caused a shortage rule exception for a department in the store, with each entry in the list of items comprising an identifier of the item, a value for a primary shortage metric that the shortage rule was based on, and a value for at least one additional shortage metric.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 2 provides an example of a shortage user interface providing a shortage summary.

FIG. 3 provides an example of a shortage user interface providing a receiving shortage summary.

FIG. 4 provides an example of a shortage user interface providing a reverse logistics shortage summary.

FIG. 5 provides an example of a shortage user interface providing a point-of-sale shortage summary.

FIG. 6 provides an example of a shortage user interface providing a salesfloor shortage summary.

FIG. 7 provides an example of a shortage user interface providing a backroom shortage summary.

FIG. 8 provides an example of a shortage user interface providing a theft shortage summary.

FIG. 9 provides an example of a shortage user interface providing a count update rule exception report.

FIG. 10 provides an example of a shortage user interface providing an empty package rule exception report.

FIG. 11 provides an example of a shortage user interface providing a theft rule exception report.

FIG. 12 provides an example of a shortage user interface providing a ghost rule exception report.

FIG. 13 provides an example of a shortage user interface providing a baffles exception report.

DETAILED DESCRIPTION

Figure 1:
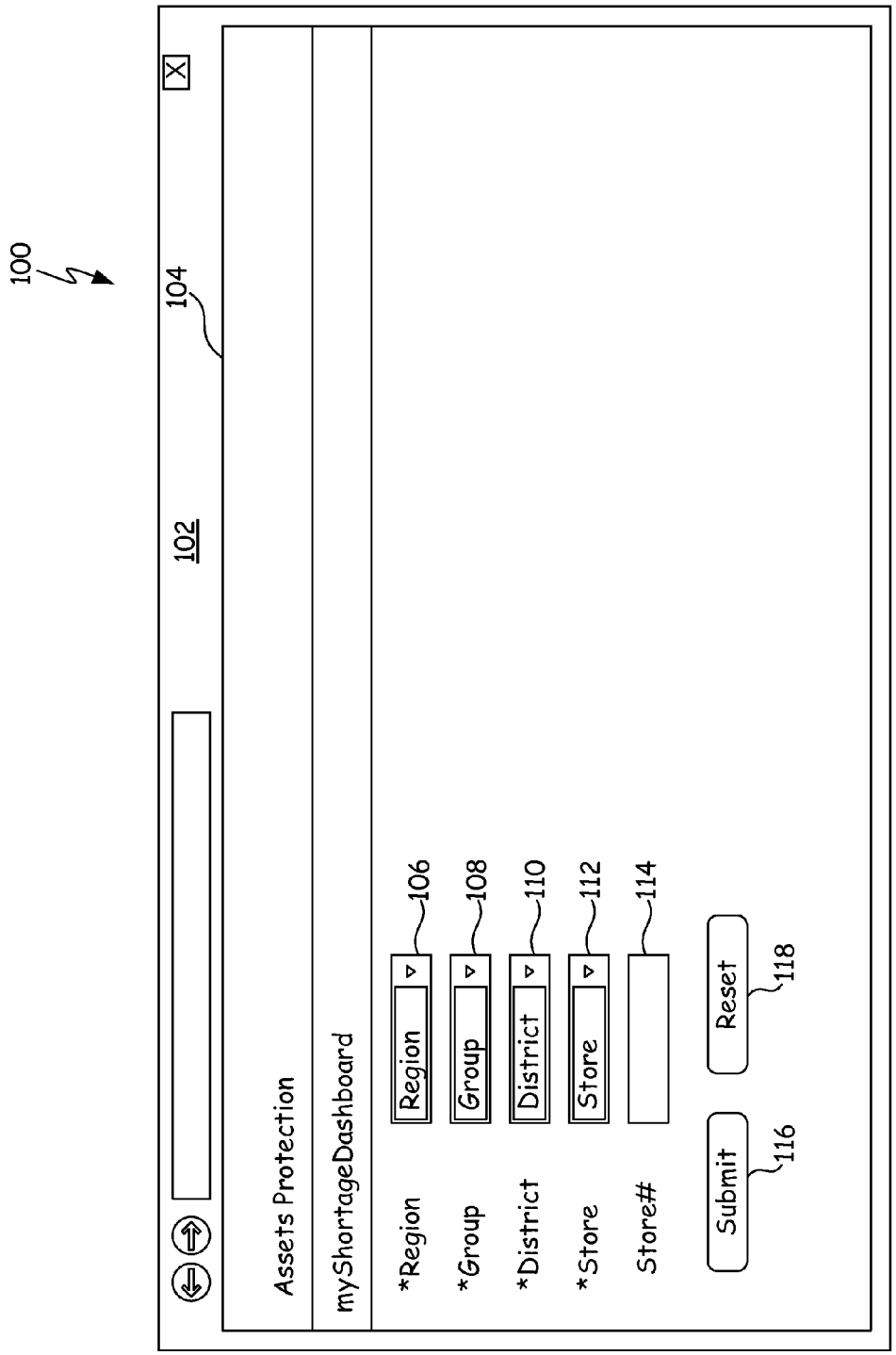
FIG. 1 provides an example of a shortage user interface providing a store selection screen.

Embodiments described below provide user interfaces showing shortage reports that permit store managers to quickly identify various types of shortages and more importantly help store managers identify the root causes of shortages within a store.

There are several different causes of shortage and several different parameters for tracking shortage. Some parameters are inclusive of and overlap other more detailed parameters. Examples of shortage parameters that can be tracked include count updates, empty packages, thefts, baffles, ghosts, item merges, sweep discrepancies, Central Return Center (CRC) aging, and receipt quantity discrepancies.

Count updates represent a discrepancy between the physical count of an item in a facility and the expected number of items in the facility. Empty packages represent a count of the number of packages found in the facility that have had their contents removed. Thefts track the number of stolen items that have been detected using either video surveillance or eyewitness accounts. Baffles represent discrepancies in a storeroom of a facility in which items that are not expected to be in the storeroom appear in the storeroom. Ghosts represent a count of items that should be in a storeroom of a facility but are not in the storeroom. Sweep discrepancies represent a difference between the number of items sent and the number of items received when a retail facility returns items to a distribution center or a vendor. CRC aging represents a discrepancy between a number of items shipped from a retail store to a central return center and a number of items received at the central return center. Receipt quantity discrepancies represent a discrepancy between a number of items on a purchase order and a number of items actually received at a store. Item merges involve discrepancies that occur when two similar items are merged into a single item description in a database. For instance, a 10-pack of markers in one location within a store will be merged in the database with a 12-pack of markers in another location in the store. After the merge has occurred in the database, store personnel should move the 10-pack of markers to the 12-pack location. If this move does not occur, the count of the markers at the 12-pack location will be smaller than the database expects.

Shortage data is collected on a per item basis and is aggregated at various levels including classes of products, departments and the entire store. In accordance with most embodiments, the shortage data is generated by making physical counts of products in various parts of the store and logging events and instructions that involve products such as thefts, receipt of merchandise and item merge instructions.

Shortage values vary from week to week. To avoid reacting to every change in the shortage values, some embodiments discussed below establish rules that indicate when a department has experienced a significant shortage event. To make such a determination, a rule examines values of a shortage metric for a select period of time referred to below as the exception period. If the values of the shortage metric exceed certain thresholds during the exception period, a rule exception is raised or triggered. For each rule exception, embodiments below provide an exception report that describes the department involved in the rule exception and the identities of at least some of the items in the department that contributed to the rule exception.

Because of the large number of shortage parameters, it is difficult for store managers to identify root causes of shortages. For example, when a count update indicates there are missing items, it is not clear if the items have been stolen, the items have simply not been moved as part of an item merge or the items were in fact never received at the store. To overcome this problem, embodiments described below provide both the primary shortage metric and at least one secondary shortage metric in the exception reports. By displaying the value of not only the primary shortage metric that caused the rule exception but additional secondary shortage metrics, the reports allow managers to see if particular items have been involved in more than one shortage discrepancy and as such allow the managers to detect the root cause of a shortage. In addition, the reports provide links to instruction pages that can assist store personnel in identifying the root causes of shortages within the store and to thereby reduce shortage discrepancies within the store.

The various embodiments provide a collection of user interfaces in the form of pages to allow a user to select and view particular shortage reports and rule exception reports. In one embodiment, a store selection page is initially presented to the user. FIG. 1 provides an example user interface 100 that includes a web browser window 102 and a store selection page 104 rendered within web browser window 102. In other embodiments, store selection page 104 may be rendered by a different application instead of a web browser.

Store selection page 104 includes region selection box 106, group selection box 108, district selection box 110 and store selection box 112. Each selection box includes a pull down menu that is populated with selectable entries based on the entries selected in the control box above it. For example, group selection box 108 contains a pull down menu having group names corresponding to the region selected in region selection box 106. Thus, the user must select a region in region selection box 106 before the pull down menu in group selection box 108 is populated. Once the region is selected, the groups for the selected region are retrieved and are used to populate group selection box 108. Similarly, the districts in district selection box 110 are selected based on the group selected in group selection box 108 and the stores in store selection box 112 are selected based on the district selected in district selection box 110.

As an alternative to using selection boxes 106, 108, 110 and 112, a user can simply enter a store ID in store identifier box 114. Once a store has been selected, the user may select submit button 116 to request a shortage summary page for the selected store. If the user wishes to reset selection boxes 106, 108, 110, 112 and 114, they may select reset button 118, which will cause each of the selected controls to return to its initial state.

FIG. 2 provides a user interface 200 providing a shortage summary page 204 displayed within web browser window 102. To indicate that page 204 is a shortage summary page, a summary page link 208 is highlighted on a menu 206 of selectable page links that include links for a RECEIVING shortages summary page, a REVERSE LOGISTICS shortages summary page, a POS shortages summary page, a SALSEFLOOR shortages summary page, a BACKROOM shortages summary page, and THEFT shortages summary page. Each of these pages provides a summary of a particular class of shortages as discussed further below.

Shortage summary page 204 also includes a store identifier 301 and an information button 224. By selecting information button 224, the user can request a page providing instructions for using the shortage summary page.

Shortage summary page 204 further includes a sales box 210 indicating one or more monthly sales dollar values and a year-to-date sales dollar value for the entire selected store. Summary page 204 also includes a shortage exception summary providing a count of various classes of shortage rule exceptions detected for one or more months of the year. Shortage exception summary 212 includes a year-to-date total for each class of rule exception and a relative ranking of the store for a total rule exception for each month and total year-to-date rule exceptions of each class. The ranking may be performed enterprise-wide or within individual districts, groups or regions, for example.

Shortage summary page 204 also includes a shortage dollar amount table 214 for general merchandise, perishable merchandise and all merchandise. Table 214 includes shortage fields such a dollar amount for shortages for this year (TY$), the percentage that this year's shortage is to store sales (TY %), last year's dollar amount shortage for this store (LY$), last year's percent of sales for shortages (LY %), the change in the percentages from last year to this year (B/(P) %), a goal percentage (Goal %), and a difference from the goal percentage (B/(P) Goal %) for this year.

Shortage summary page 204 also includes a top 10 departments shortage table 216 that lists the departments with the highest shortage dollar values for the current year in order from highest dollar value to lowest dollar value. Table 216 includes descriptions of the departments, shortage dollar amounts for this year (SHTG TY$), shortage percentage relative to sales for the department (SHTG TY %), percentage change in shortage relative to last year (SHTG B/(P) LY %), sales for the department (SALES) and percentage change of sales relative to last year (Sales B/(P) LY %).

Shortage summary page 204 also includes comments table 218 and commitments table 220. Comments table 218 allows store personnel to enter comments about various categories of shortage and commitments table 220 allows store personnel to enter actions that will be taken to mitigate the shortage and what personnel will be responsible for those actions. Tables 218 and 220 may receive input from the user within web browser window 102 or a user may export shortage summary page 204 to a spreadsheet using Export to Spreadsheet link 222 and then enter the information in the spreadsheet application.

FIG. 3 provides an example user interface 300 showing a receiving shortage page 303 displayed within web browser window 102. Receiving shortage page 303 provides a summary of shortages associated with receiving products at a store and is displayed in response to a user selecting receiving link 302, which is shown as being highlighted in FIG. 3. Receiving shortage page 303 includes a store identifier 301 and an information link 310. By selecting information link 310, user is able to request an information page that describes the various receiving shortages and techniques for analyzing receiving shortages based on reports provided for individual exceptions.

Receiving shortage page 303 includes a summary table 304 that lists individual types of receiving shortages and counts of rule exceptions for each month for each type of receiving shortage. Totals for all receiving shortages for each month are provided as well as year-to-date totals for each type of receiving shortage. Rankings for the store are also provided based on the receiving shortages.

Receiving shortage page 303 also includes a rule exceptions table 306 that provides a list of receiving rule exceptions that have been triggered based on various shortage metrics. For each rule exception, a date that the rule exception was detected and an exception type are provided. The exception type provides an indication of the rule and week when the exception took place. In many embodiments, the exception type is a selectable link, such as link 308, that when selected provides a page containing details about the rule exception. Table 306 also includes fillable fields for receiving, the status of the exception, the results of any mitigation, the reason for the exception and the impact of the exception. Each of these fields can be filled in by store personnel in web browser window 102 or by exporting receiving shortage page 303 to a spreadsheet program using Export to Spreadsheet link 222.

FIG. 4 provides a user interface 400 showing a reverse logistics shortage page 401 displayed within web browser window 102. Reverse logistics shortage page 401 provides a summary of shortages associated with returning products to a vendor or a CRC and includes highlighted reverse logistics link 402, store identifier 301 and information link 410. By pressing information link 410, a user is able to request a page that describes the contents of reverse logistics shortage page 401 as well as techniques for analyzing exception reports provided by links such as link 408 in exception table 406. Page 401 also includes a summary table 404 that provides a count of various types of reverse logistic shortage exceptions. Tables 404 and 406 are similar to tables 304 and 306 of FIG. 3.

FIG. 5 provides a user interface 500 showing a point-of-sale (POS) shortage page 501 displayed within web browser window 102. POS shortage page 501 provides a summary of shortages associated with a point-of-sale system such as unidentified sales, online returns and voids. In POS shortage page 501, POS link 502 is shown as being highlighted. POS shortage page 501 includes store identifier 301 and an information button 510 that allows a user to request an information page describing the contents of POS shortage page 501 and ways in which to analyze rule exception reports provided by links such as link 508 in exception table 506. POS shortage page 501 also includes summary table 504, which provides a summary of POS rule exceptions for various categories of POS shortages. Tables 504 and 506 operate in a similar manner to tables 304 and 306 of FIG. 3.

Figure 6:
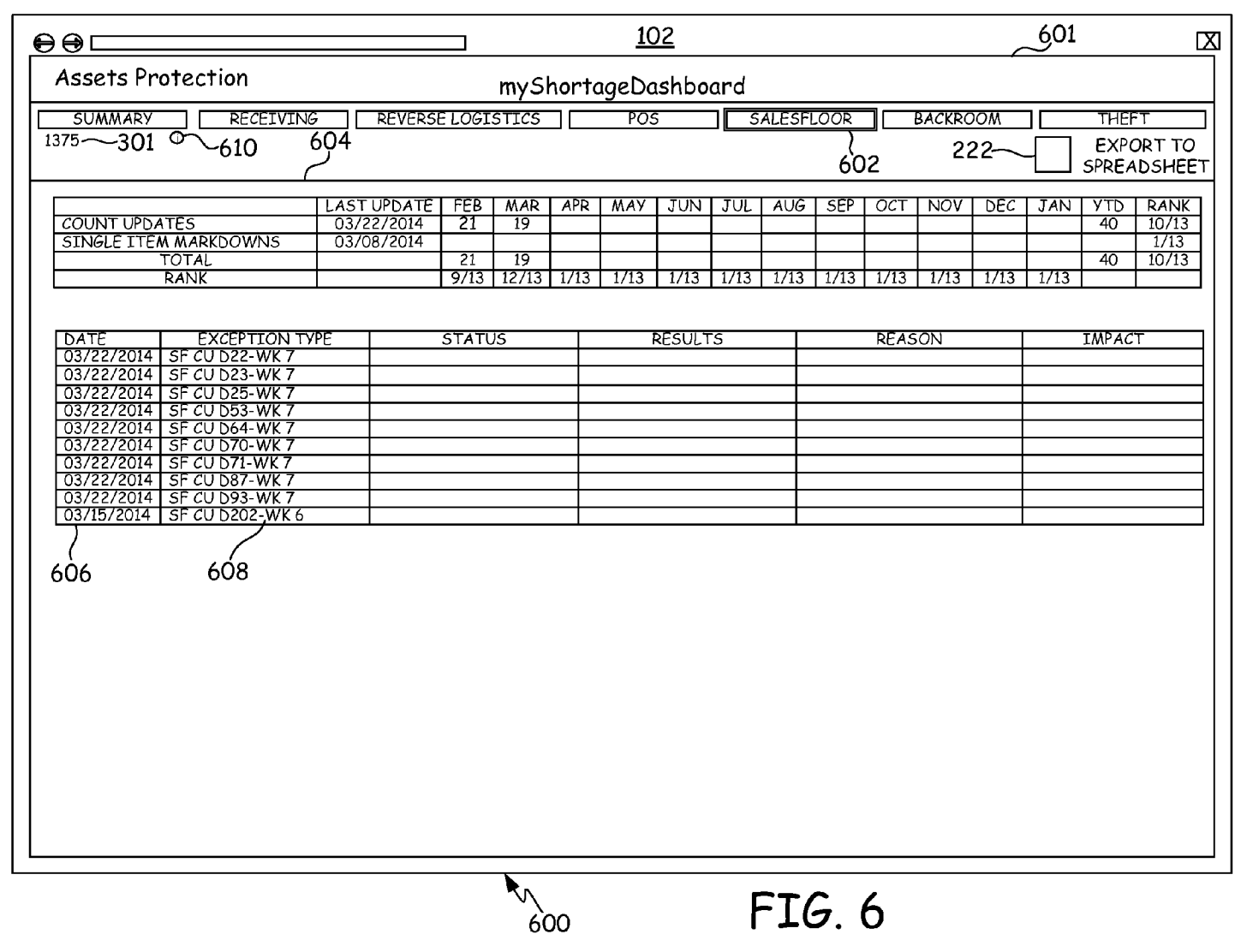

FIG. 6 provides a user interface 600 showing a salesfloor shortage page 601 displayed within web browser window 102. Salesfloor shortage page 601 provides a summary of shortages associated with the salesfloor such as count update discrepancies, and single item markdowns. In salesfloor shortage page 601, salesfloor link 602 is shown as being highlighted. Salesfloor shortage page 601 includes store identifier 301 and an information button 610 that allows the user to request an information page describing the contents of salesfloor shortage page 601 and ways in which to analyze rule exception reports generated by following a link such as link 608 in exception table 606. Salesfloor shortage page 601 also includes summary table 604, which provides a summary of salesfloor rule exceptions for various categories of salesfloor shortages. Tables 604 and 606 operate in a similar manner to tables 304 and 306 of FIG. 3.

FIG. 7 provides a user interface 700 showing a backroom shortage page 701 displayed within web browser window 102. Backroom shortage page 701 provides a summary of shortages associated with a backroom or storeroom such as baffles, ghosts and item merges. In backroom shortage page 701, backroom link 702 is shown as being highlighted. Backroom shortage page 701 includes store identifier 301 and an information button 710 that allows the user to request an information page describing the contents of backroom shortage page 701 and ways in which to analyze rule exception reports generated by following a link such as links 708 and 709 in exception table 706. Backroom shortage page 701 also includes summary table 704, which provides a summary of backroom rule exceptions for various categories of backroom shortages. Tables 704 and 706 operate in a similar manner to tables 304 and 306 of FIG. 3.

FIG. 8 provides a user interface 800 showing a theft shortage page 801 displayed within web browser window 102. Theft shortage page 801 provides a summary of shortages associated with theft in the store including empty packages and theft events. In theft shortage page 801, theft link 802 is shown as being highlighted. Theft shortage page 801 includes store identifier 301 and an information button 810 that allows the user to request an information page describing the contents of theft shortage page 801 and ways in which to analyze rule exception reports generated by following a link such as links 808 and 809 in exception table 806. Theft shortage page 801 also includes summary table 804, which provides a summary of theft rule exceptions for various categories of theft shortages. Tables 804 and 806 operate in a similar manner to tables 304 and 306 of FIG. 3.

FIG. 9 provides a user interface 900 showing a count updates exception report 901 displayed within web browser window 102. Count update exception report 901 is produced in response to a user selecting a rule exception link, such as link 608, on salesfloor summary page 601. Count update exception report 901 is associated with the triggering of an exception to a rule that uses the count update metric as its primary shortage metric.

Rule exception page 901 includes department exception table 902 that identifies the department that triggered the rule exception in the store, an exception period associated with the rule, the previous year's average count update dollar amount with positive values indicating excessive inventory and negative values indicating missing inventory, the average count update dollar amount over the rule's exception period, the average sales amount over the rule's exception period, and the percentage of the average count update over the average sales for the rule's exception period.

In table 902, a rule's exception period is the period of time examined by the rule when making a determination about whether an exception should be triggered.

Exception page 901 also includes class detail table 904 that provides information for each class within the department. Class detail table 904 includes a description of each class, a total count update dollar amount over the past 8 weeks, a total count update dollar amount over the exception period found in table 902, the total count update quantity over the past 8 weeks and the total count update quantity over the exception period. Table 904 allows store personnel to quickly identify whether the current rule exception is unusual or is part of a larger trend. In addition, table 904 allows personnel to identify specific classes within each department that may require additional mitigation efforts.

Exception page 901 also includes a top 25 items table 906 that lists the top 25 items that contributed to the rule exception. Since exception page 901 is for a rule that uses count updates as the primary shortage metric, table 906 only lists items that had count update values that contributed to the count updates rule exception. Items that had significant values for other shortage metrics are not included in table 906 if the count updates values for the items did not contribute to the count updates rule exception.

In table 906, the top 25 items are selected based on the count update dollars lost over the rule's exception period for each item. The count update dollar amount is determined by the price of the item times the number of items missing according to the count update value over the rule's exception period. Top 25 items table 906 is ordered with the top count update dollar amount item being listed first.

Top 25 items table 906 includes an item number 907 and an item description 909. Each item entry also includes a total count update dollar amount over the last 8 weeks 908, a total count update dollar amount over the exception period 910, the total count update quantity over the last 8 weeks 912, and the total count update quantity over the exception period 914. Each of fields 908, 910, 912 and 914 provide values for the primary shortage metric, which in this case is count updates.

In addition to the primary shortage metric values, exception report 901 also provides a plurality of additional or secondary shortage metric values including total theft quantity 916, total empty package quantity 918, total receipt quantity difference 920, total CRC aging quantity 922, total sweep quantity difference 924, item merge quantity 926 and whether there are ghosts 928 or baffles 930 for the item. In accordance with some embodiments, the additional or secondary shortage metrics are determined over the previous 8 weeks and in other embodiments, are determined over the exception period. Thus, for each entry or item in top 25 items table 906, a primary shortage metric value and at least one additional secondary shortage metric value is provided.

By providing not only the primary shortage metric value, but also additional or secondary shortage metric values, exception report 901 provides additional information to store personnel that allow the store personnel to determine the root cause of the shortage. For example, in entry 932, the count update quantity 914 is five, which can be explained in part by a corresponding item merge quantity 932 of five. Thus, team personnel will be able to identify that the root cause of the count update discrepancy for item 932 was caused by a failure to move items during an item merge.

FIG. 10 provides a user interface 1000 including an empty packages exception report 1001 displayed within web browser 102. Exception report 1001 is provided in response to a user selecting a link such as link 808 of FIG. 8.

Empty packages exception page 1001 includes a department exception table 1002, which identifies the department that triggered the exception, the exception period associated with the rule that was triggered, the average empty package dollar amount for last year and the average empty package dollar amount over the exception period. The average empty package dollar amounts are the average weekly empty package dollar amounts.

Empty package exception page 1001 also includes class detail table 1004 that provides information about empty package shortages for each class within the department. Class detail table 1004 includes identifiers for the class including a class ID number and a class description as well as a total empty package dollar amount over the last 8 weeks, a total empty package dollar amount over the exception period, a total empty package quantity over the last 8 weeks and a total empty quantity over the exception period.

Empty package exception report 1001 also includes a top 25 items list 1006 that lists up to 25 items that have primary shortage metric values—empty package values—that contributed to the rule exception. The items in top 25 items list 1006 are those items with the highest total empty package dollar amount over the exception period and are ordered based on the total empty package dollar amount over the exception period. In table 1006, each entry includes an item number field 1008 and an item description field 1009 that describe the item, a retail value field 1011 that describes the price per item, a total empty package dollar amount over the last 8 weeks 1010, a total empty package dollar amount over the exception period 1012, a total empty package quantity over the last weeks 1014, a total empty package quantity over the exception period 1016. Since empty package exception report 1001 is based on a primary shortage metric of empty package values, fields 1010, 1012, 1014 and 1016, which all refer to empty package values, all relate to the primary shortage metric for empty package report 1001. In addition, top 25 items list 1006 provides secondary or additional shortage metrics including total theft quantity 1018, total count updates quantity 1020 and total CRC aging quantity 1022. Note that the items listed in top 25 items 1006 are listed solely on the basis of the primary shortage metric of empty packages. The additional or secondary shortage metrics of theft quantity, count update quantity and CRC aging quantity are provided for each item to allow store personnel to determine a root cause of the empty package shortage. For example, if the empty package quantity matches the total count update quantity, store personnel will know that someone is removing products from their packaging. In addition, if the theft quantity is low, store personnel will be able to determine that camera positions may not be adequate to catch the person removing the items from the packaging and therefore will indicate to the store personnel that camera positions or additional cameras are needed. Further, if the number of empty packages matches the CRC aging quantity, it provides an indication to store personnel that someone is removing items from packaging instead of returning the packages to the CRC.

FIG. 11 provides a user interface 1100 including a theft exception report 1101 displayed in a user interface 1100 within a web browser 102. Theft exception report 1101 is returned in response to a user requesting the exception report using a link such as link 809 of FIG. 8.

Theft exception report 1101 includes a department exception table 1102 indicating the department that caused the rule exception, the exception period of the rule that was triggered, an average weekly theft amount last year for the department and an average weekly theft amount over the exception period.

Theft exception report 1101 also includes a class detail table 1104 that provides information about individual classes of products within the department. For each class, table 1104 provides a description of the class, a total theft dollar amount over the last 8 weeks, a total theft dollar amount over the exception period, a total theft quantity over the last 8 weeks, a total theft quantity over the exception period, internal resolution dollar amounts and external resolution dollar amounts, prevention dollar amounts and intelligence dollar amounts.

Theft exception report 1101 also includes a top 25 items table 1106 that lists the top 25 stolen items in terms of theft dollar amount over the exception period. Each entry in table 1106 is for a separate item and each entry includes an item number 1108, an item description 1109, a retail value 1111, a total theft dollar amount over the last 8 weeks 1110, a total theft dollar amount over the exception period 1112, total theft quantity over the last 8 weeks 1114 and a total theft quantity over the exception period 1116. Because theft exception report 1101 is based on theft as the primary shortage metric, fields 1110, 1112, 1114 and 1116 all provide information about the primary shortage metric.

In addition, table 1106 provides additional or secondary shortage metrics including total empty package quantity 1118, total count update quantity 1120, total receipt quantity difference 1122, total no receipt quantity 1124, total CRC aging quantity 1126, and ghost binary value 1128. Items are placed in top 25 items table 1106 solely on the primary shortage metric of theft. However, the additional or secondary metric values are also provided in table 1106 to allow store personnel to determine if there are additional shortages associated with the item other than the thefts which triggered the rule exception. This allows store personnel to determine whether the items are being targeted by thieves or whether the other shortages were associated with the thefts. For example, if the number of empty packages 1118 matches the number of thefts recorded, the empty packages may be explained by the recorded thefts. Similarly, low theft values with high values for one of total receipt quantity differences 1122, total no receipt quantity 1124 or total CRC aging quantity 1126, provide an indication to store personnel that the location of cameras may not be ideal since cameras are not recording the removal of items associated with those other shortage events. This may indicate to store personnel that camera positions should be changed or additional cameras are needed.

FIG. 12 provides a user interface 1200 providing a ghost exception report 1201 within web browser 102. Ghost exception report 1201 is provided in response to a user selecting a link, such as link 708 of FIG. 7 to request an exception report.

In ghost exception report 1201, a table 1202 lists all items that were reported as missing from a backroom including the date and time that the item was noted as being missing. Each entry in table 1202 includes an item identifier 1204 and additional secondary shortage metrics such as total theft quantity 1206, total empty package quantity 1208, total count update quantity 1210, total item merge quantity 1212 and baffles indication 1214. The additional or secondary shortage metrics help store personnel determine the cause of the ghost, by for example, indicating that the item was stolen if the theft quantity 1206 matches the number of missing items or that the item was removed from its packaging if an empty package was found, as found in total empty package quantity 1208. Ghost exception report 1201 also includes a stockroom activity detail table 1216 that provides a record of items stored in or removed from the stockroom over a period of time.

FIG. 13 provides an example of a user interface 1300 showing a baffles exception report 1301 within a web browser 102. Baffles exception report 1301 is produced in response to a user selecting a link such as link 709 of FIG. 7. Baffles exception report 1301 includes a table 1302 containing a separate entry for each item 1304 that was found within the back storeroom but was not expected to be in the back storeroom for a particular week. In addition, baffles exception report 1301 includes secondary shortage metric values such as total count update quantity 1306, item merge quantity 1308 and ghost indicator 1310. By providing secondary or additional shortage metrics 1306 and 1308, store personnel are able to determine whether an item that should be on the sales floor was mistakenly put in the storeroom. For example, if the personnel were supposed to move an item from one position on the sales floor to another position on the sales floor as part of an item merge, but instead placed the item in the storeroom, a baffles exception would be raised for the item appearing in the storeroom while at the same time, a matching item merge quantity would appear since the item was not moved to the correct position on the sales floor.

Figure 14:
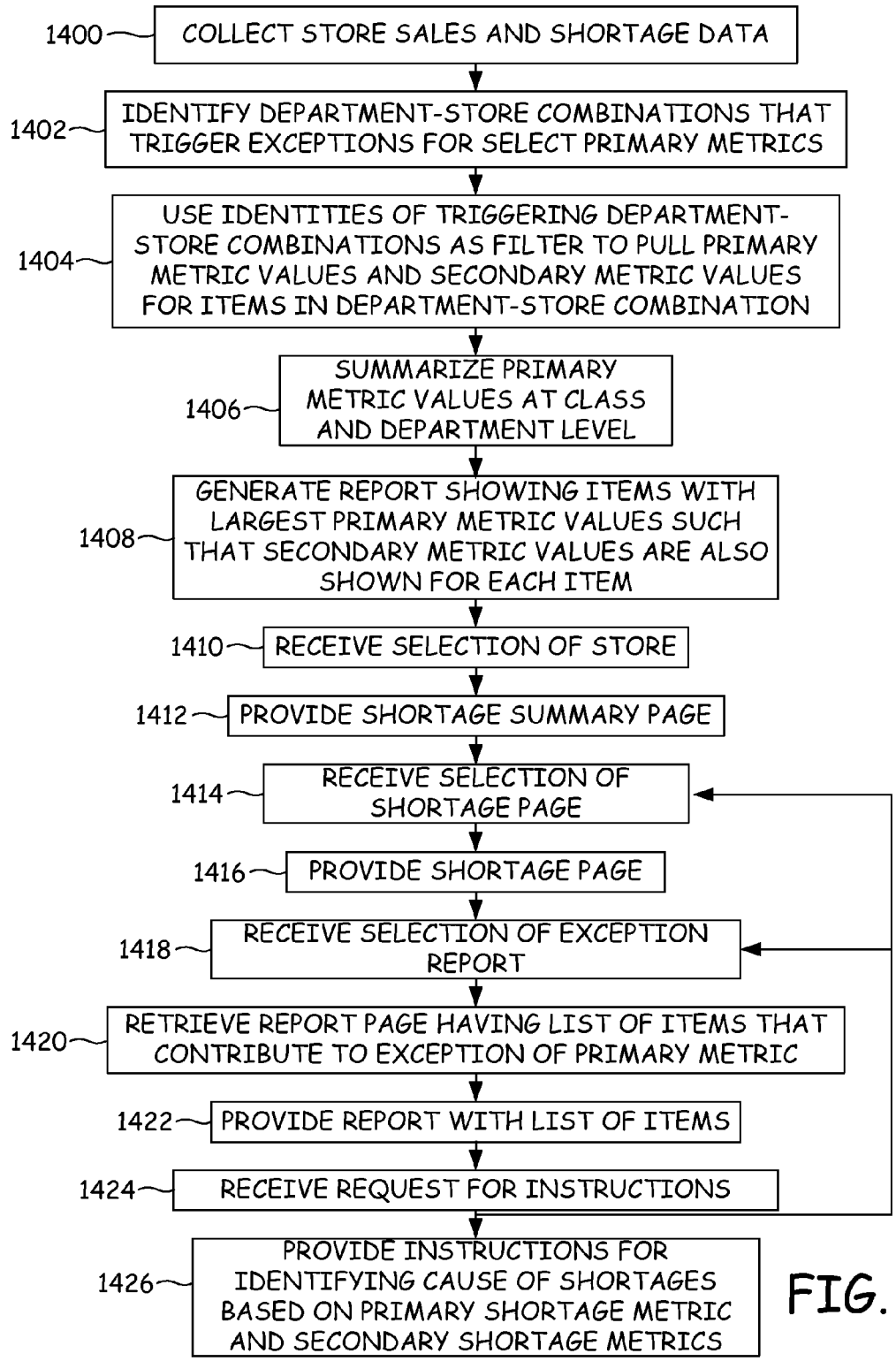
FIG. 14 provides a flow diagram for creating and providing shortage reports including shortage summaries, exception reports and instructions.
Figure 15:
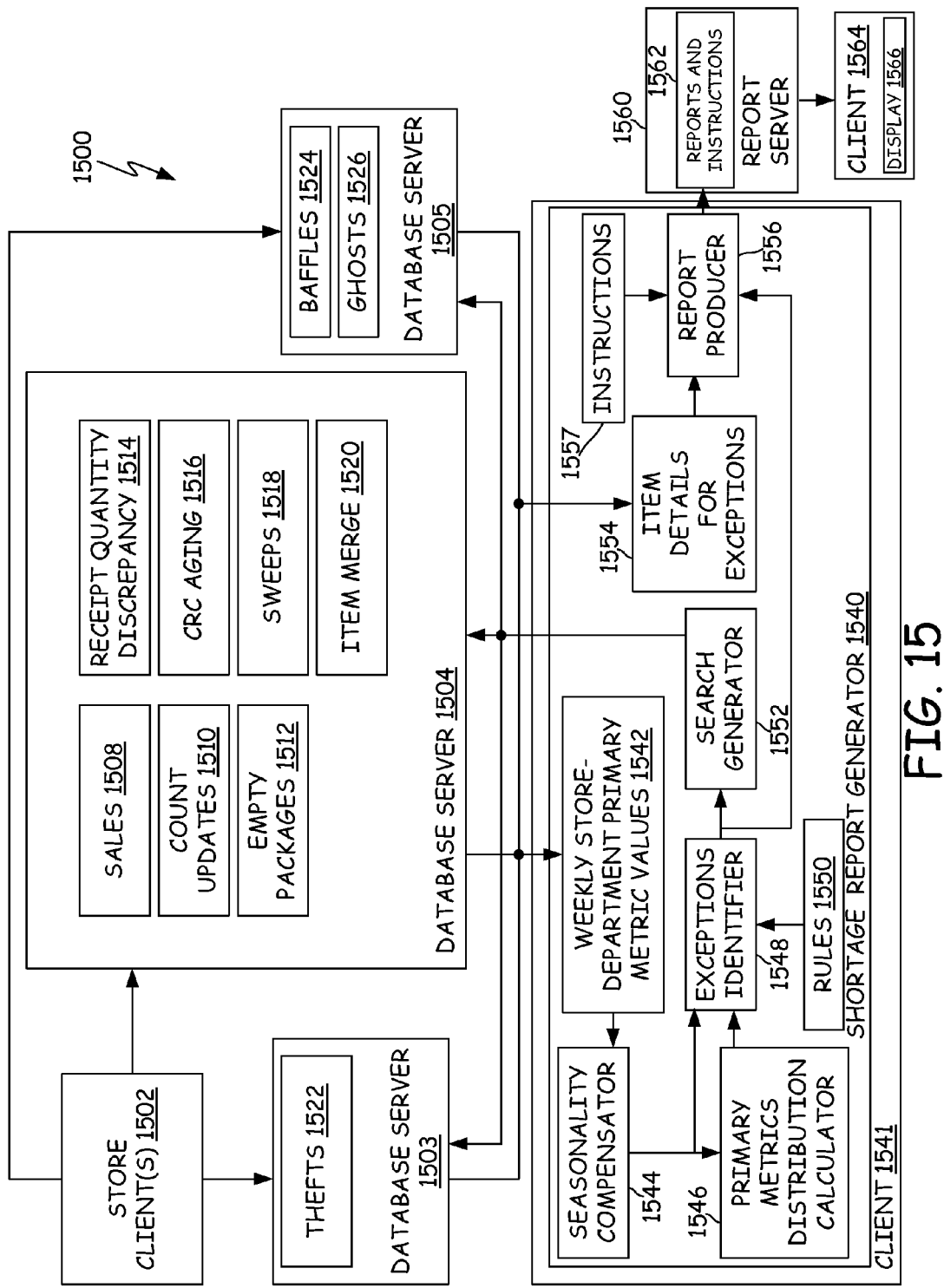
FIG. 15 provides a block diagram of elements used in the method of FIG. 14.

FIG. 14 provides a method of generating and providing shortage rule exception reports. FIG. 15 provides a block diagram of a system 1500 used to implement the method of FIG. 14 in accordance with some embodiments.

In step 1400 of FIG. 14, sales and shortage data is collected by one or more store client devices 1502 (FIG. 15) across a retail enterprise and are stored across one or more database servers such as database servers 1503, 1504, and 1505 (FIG. 15). The sales and shortage data is collected on a per item basis and is aggregated at various levels including classes of products, departments and the entire store. In accordance with most embodiments, the sales data is generated automatically from data provided by point of sales (POS) systems when a customer makes a purchase. The shortage data is generated by making physical counts of products in various parts of the store and logging events and instructions that involve products such as thefts, receipt of merchandise and item merge instructions.

In accordance with one embodiment, different database servers contain different sales and shortage information. As shown in the embodiment of FIG. 15, for example, theft shortage metrics 1522 are collected and stored in database server 1503, baffles shortage metrics 1524 and ghosts shortage metrics 1526 are stored in database server 1505, and sales 1508 and shortage metrics including count updates 1510, empty packages 1512, receipt quantity discrepancy 1514, CRC aging 1516, sweeps 1518 and item merges 1520 are stored in database server 1504. In each database server, the sales data and the shortage metric data is stored at a per item level and at aggregated higher levels such as class, department and store. In accordance with some embodiments, the data in database servers 1503, 1504, and 1505 include data for multiple preceding years and for the current year.

At step 1402, a shortage report generator 1540 executing on a processor in a client device 1541, identifies department-store combinations that trigger exceptions for select primary metrics. Steps involved in step 1402 are depicted in the flow diagram of FIG. 16.

Figure 16:
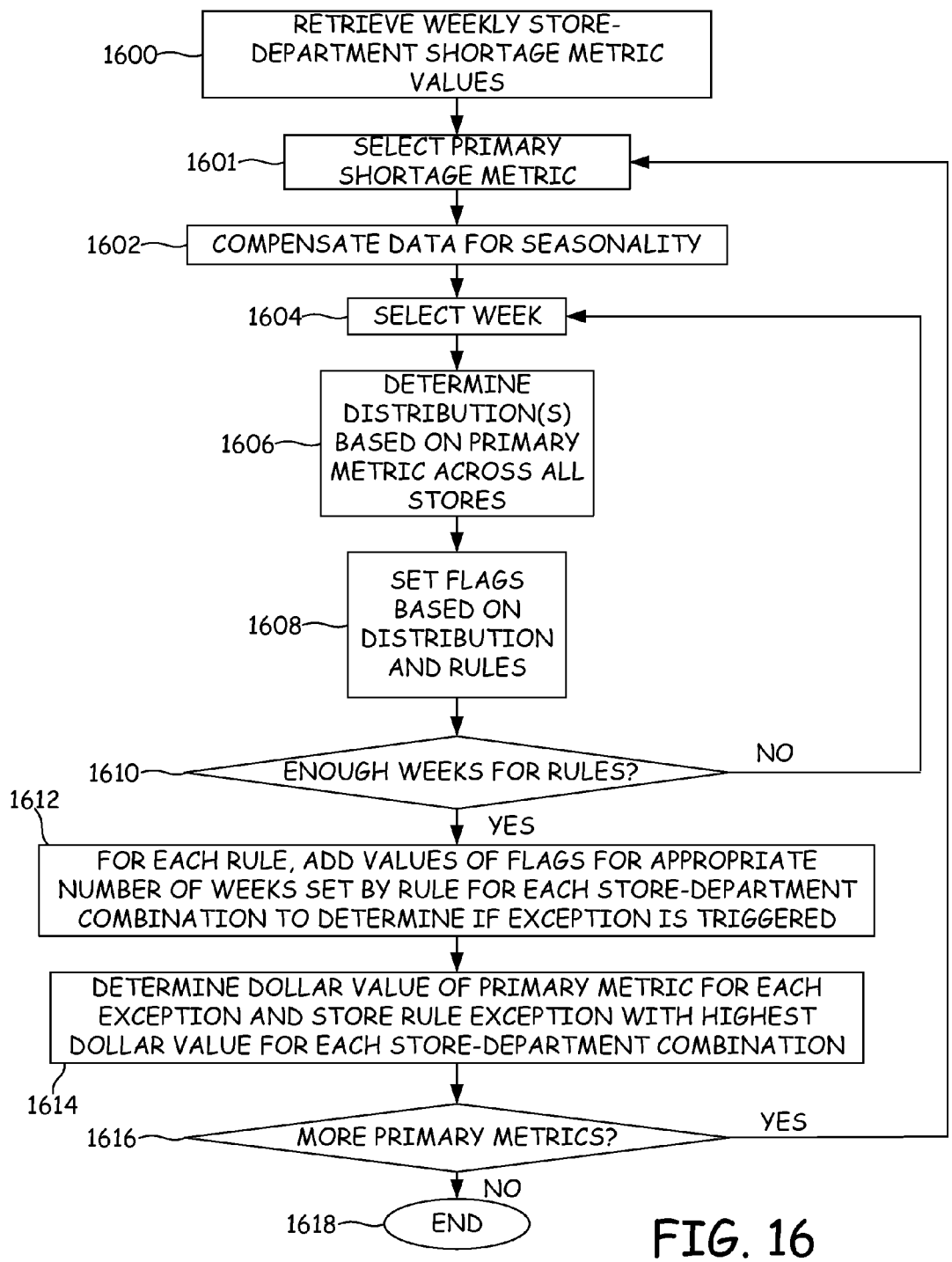
FIG. 16 provides a flow diagram of a method of identifying rule exceptions.

At step 1600 of FIG. 16, shortage report generator 1540 queries database servers 1503, 1504, and 1505 for weekly store-department sales and shortage metric values 1542. These queries are made at the department level and as such do not require data for individual items but only for the departments in each store. This greatly reduces the amount of time needed to perform the queries. In accordance with one embodiment, weekly store-department sales and shortage metric values 1542 include values for all stores in a retail enterprise and include data for each week of the previous three years.

At step 1601, a primary shortage metric is selected from a set of possible primary shortage metrics such as count update, empty packages, thefts, baffles, ghosts, item merges, sweep discrepancies, CRC aging, and receipt quantity discrepancies, for example. At step 1602, weekly store-department data 1542 for the primary metric is compensated for seasonality by a seasonality compensator 1544. The process of step 1602 is depicted in the flow diagram of FIG. 17.

Figure 17:
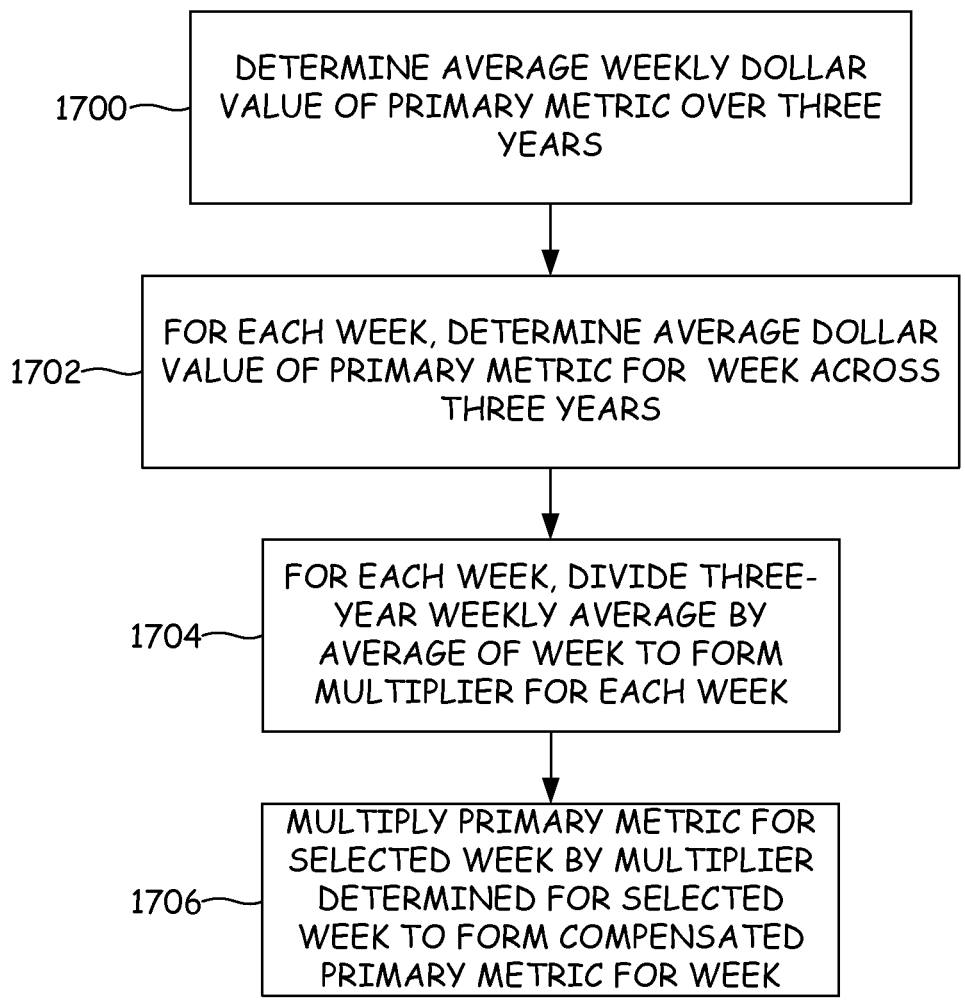
FIG. 17 provides a flow diagram of a method of compensating data for seasonality.

In step 1700 of FIG. 17, an average weekly dollar value of the primary shortage metric over three years is determined for the store as a whole. At step 1702, for each week in the year, an average dollar value of the selected primary shortage metric during that week over the last three years is determined for the store as a whole. At step 1704, a seasonality multiplier is determined for each week by dividing the average weekly dollar value determined in step 1700 by the average dollar value for the week determined at step 1702. At step 1706, the weekly data for the primary shortage metric for each department in the store is multiplied by the respective weekly multiplier to form seasonally compensated primary shortage metric values.

Returning to FIG. 16, after the primary shortage metric has been seasonally compensated at step 1602, a week is selected. In accordance with one embodiment, eight consecutive weeks of data are needed to determine if there are rule exceptions. At step 1602, any of the eight consecutive weeks that have not been analyzed can be selected.

Figure 18:
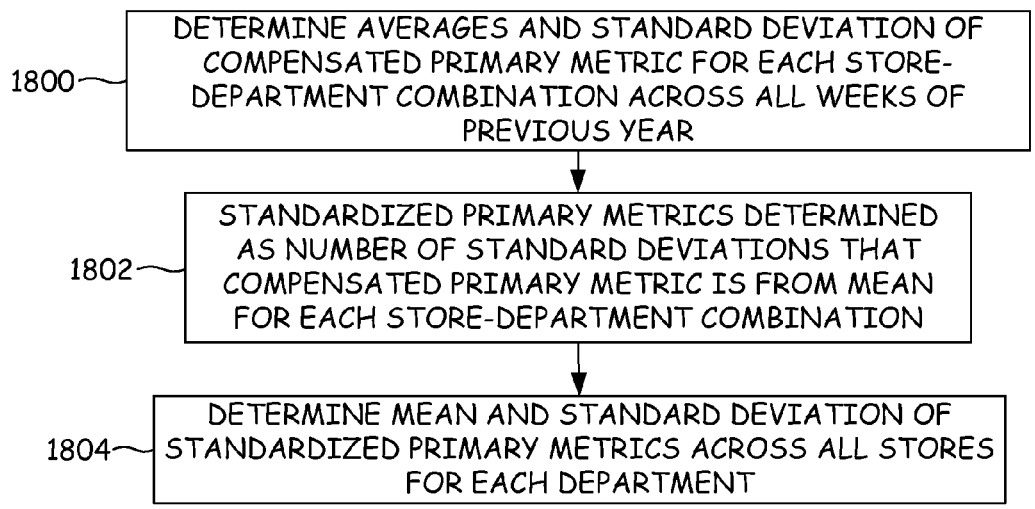
FIG. 18 provides a flow diagram of a method of forming a normal distribution.
Figure 20:
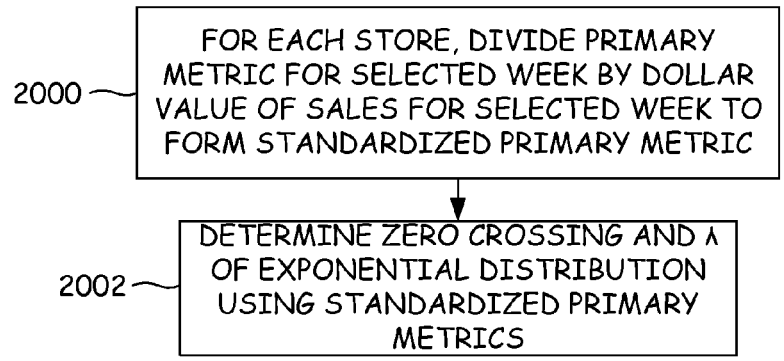
FIG. 20 provides a flow diagram of a method of generating an exponential distribution.

At step 1606, the seasonally compensated values of the primary shortage metric for the selected week are used by a primary metrics distribution calculator 1546 to determine distributions based on the values of the primary shortage metric across all stores. FIGS. 18 and 20 provide methods for determining such distributions under two separate embodiments.

In FIG. 18, the distribution is a normal distribution of standard deviations. The method of FIG. 18 begins at step 1800, where averages and standard deviations of seasonally compensated primary metric values are determined for each store-department combination across all weeks of the previous year. Thus, for each store-department combination, the seasonally compensated primary metric values of each week of the previous year are averaged and a standard deviation is determined using a normal distribution. This results in a separate mean and standard deviation for each store-department combination.

At step 1802, standardized primary metric values are determined for each store-department combination by identifying the number of standard deviations the selected week's seasonally compensated primary metric value is away from the mean seasonally compensated primary metric value. In accordance with one embodiment, this is done by subtracting the selected week's seasonally compensated primary metric value from the mean seasonally compensated primary metric value determined in step 1800 and dividing the result by the standard deviation determined in step 1800.

At step 1804, for each department, the mean and standard deviation of the standardized primary metric values across all stores are determined using a normal distribution. This involves determining the average of the department's standardized primary metric values across all stores.

Figure 19:
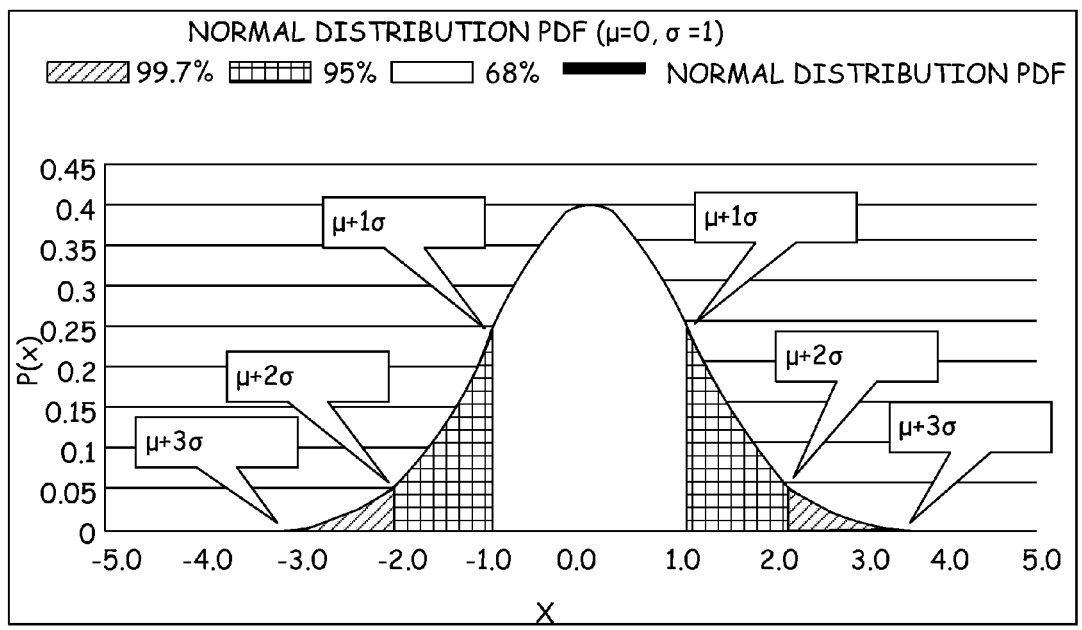
FIG. 19 provides an example of a normal distribution.

FIG. 19 shows an example of a generalized normal distribution with a mean μ and a standard deviation a. The normal distribution shown in FIG. 19 provides the general shape of normal distributions. In steps 1800 and 1804, the normal distributions have different means and standard deviations from the normal distribution shown in FIG. 19 but otherwise share the same general shape.

Figure 21:
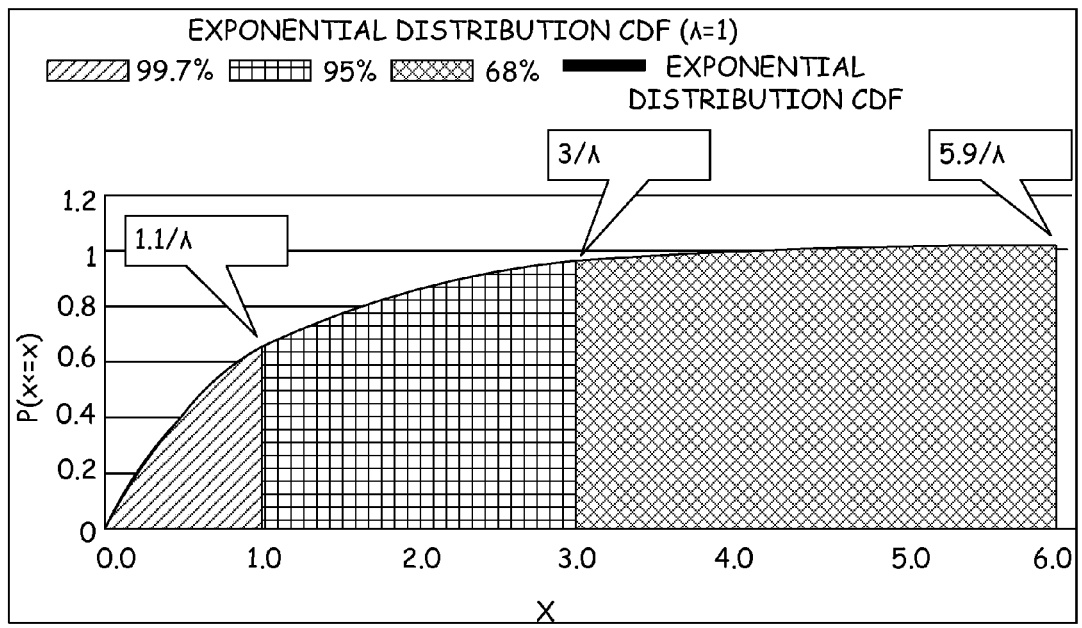
FIG. 21 provides an example of an exponential distribution.

In other embodiments, the distributions determined in step 1606 are exponential distributions, which provide a cumulative distribution function such as the one shown in FIG. 21. As shown in the flow diagram of FIG. 20, determining an exponential distribution involves first dividing the seasonally compensated primary metric by a dollar value of sales for the store-department combination to form a standardized primary metric at step 2000. The standardized primary metrics across the stores are then used to identify a zero crossing and a value of λ for the cumulative density function of the exponential distribution at step 2002.

Returning to FIG. 16, after the distributions have been determined at step 1606, the distributions are used by an exceptions identifier 1548 to set flags for rule exceptions at step 1608. Exceptions identifier 1548 sets a rule exception flag for a store-department combination if the standardized primary metric of the store-department combination crosses certain thresholds on the distribution. In the discussion below, a standardized primary metric is considered to be negative if it is less than the mean and positive if it is greater than the mean for a normal distribution. For example, if the standardized primary metric is greater than the mean and between one and two standard deviations from the mean, exception identifier 1548 sets a positive one standard deviation flag for the store-department combination for the selected week. As another example, if the standardized primary metric is more than three standard deviations less than the mean, exception identifier 1548 sets a negative three standard deviations flag for the store-department combination. In accordance with one embodiment, exception identifier 1548 sets the following flags for normal distributions when warranted: three positive standard deviations flag, three negative standard deviations flag, two positive standard deviations flag, two negative standard deviations flag, one positive standard deviation flag, one negative standard deviation flag, positive flag and negative flag. In accordance with one embodiment, exception identifier sets the following flags for exponential distributions when warranted: a three lambda flag, and a 5.9 lambda flag. In general, exception identifier 1548 sets only one flag for each store-department for the selected week by selecting the flag representing the furthest deviation. For example, if the standardized primary metric is greater than three standard deviations from the mean, exception identifier 1548 sets the three positive standard deviation flag instead of the two standard deviation flag.

After the flags are set at step 1608, the process of FIG. 16 continues at step 1610 where a check is made to see if flags have been set for enough weeks to determine if the rules have been violated. In accordance with some embodiments, different rules require different numbers of weeks with the number of weeks required for a rule being referred to as the exception period. In accordance with some embodiments, some rules require one week of data, others require three consecutive weeks of data, others require five consecutive weeks of data and still others require eight consecutive weeks of data.

If flags have not been set for enough weeks at step 1610, the process of FIG. 16 returns to step 1604 and a new week is selected. Steps 1606 and 1608 are then repeated for the newly selected week.

When flags have been set for enough weeks at step 1610, the process continues at step 1612 where exceptions identifier 1548 examines the flags for each store-department combination to determine if an exception to one of rules 1550 is triggered.

In accordance with one embodiment, a rule exception with a one week exception period is triggered for each occurrence of a three standard deviation flag (either positive or negative) and a separate rule exception with a one week exception period is triggered for each occurrence of the 5.9 lambda flag. In accordance with a further embodiment, a rule exception with a three week exception period is triggered if two standard deviation flags (both positive or both negative) occurred with no more than one week between the two flags. Similarly, a rule exception with a three week exception period is triggered if two 3 lambda flags occurred with no more than one week between the two flags. In accordance with a further embodiment, a rule exception with a five week exception period is triggered if within a five week period four one standard deviation flags (all positive or all negative) occurred. In accordance with a still further embodiment, a rule exception with an eight week exception period is triggered if eight consecutive positive flags (with any size deviation) or eight consecutive negative flags (with any size deviation) occurred.

At step 1614, for each store-department combination that triggered more than one rule exception, the average weekly dollar value of the primary shortage metric over the each rule's exception period is used to select a single rule exception for the store-department combination. This involve determining the total dollar value of the primary shortage metric over the exception period of the rule and dividing the total dollar value by the number of weeks in the rule's exception period. The rule exception with the maximum average dollar value is selected as the rule exception for the store-department combination for the selected primary shortage metric.

After step 1614, every store-department combination that triggers a rule exception for the selected primary shortage metric has been identified and if a store-department combination triggers more than one rule exception, a single one of those rule exceptions has been selected.

At step 1616, the process of FIG. 16 determines if there are more shortage metrics that should be examined as a primary shortage metric. If there are, the process returns to step 1601 to select a new primary shortage metric, and the steps of FIG. 16 are repeated. When all of the shortage metrics have been selected as the primary shortage metric, the process of FIG. 16 ends at step 1618 and the process of FIG. 14 continues at step 1404.

In step 1404, a search generator 1552 receives the list of store-department combinations and corresponding shortage primary metrics that triggered rule exceptions. Using the identities of the triggering store-department combinations as a filter, search generator 1552 submits searches to database servers 1503, 1504, and 1505 to pull primary metric values and secondary metric values for items in each triggering store-department combination that contributed to the rule exception for the primary metric value. In accordance with one embodiment, the secondary shortage metrics pulled for each primary shortage metric are those secondary shortage metrics described above for FIGS. 9-14. In accordance with some embodiments, eight weeks of primary shortage metric values and secondary shortage metric values are pulled for each triggering store-department combination. Note that using the triggering store-department combinations as a filter is necessary because it greatly reduces the number of items that must be examined during the query. In particular, it removes all the items in store-department combinations that did not trigger a rule exception from the query. The result of the search of step 1404 is item details for exceptions 1554, which are returned by database servers 1503, 1504, and 1505.

At step 1406, a report generator 1556 aggregates the returned primary and secondary shortage metric values for the items at a class level and a department level. At step 1408, report generator 1556 generates exception reports and instructions 1562 based on the item details 1554, the identified rule exceptions, and instructions 1557. Report generator 1556 stores the exception reports and instructions 1562 on report server 1560. As shown above in FIGS. 9-14, exception reports 1562 show items with the largest primary metric values for each store-department exception such that secondary metric values are also shown for each item.

At step 1410, report server 1560 receives a selection of a store through store selection page 104 of FIG. 1 displayed on display 1566 of client device 1564. In response, at step 1412, report server 1560 provides a shortage summary page such as shortage summary page 204 of FIG. 2 to client 1564. At step 1414, report server 1560 receives a selection of a shortage page and in response at step 1416 provides the selected shortage page to client 1564. Based on a selection form a user, client 1564 sends a request for an exception report, which is received by report server 1560 at step 1418. At step 1420, report server 1560 retrieves the exception report page including the list of items that contributed to the exception of the primary shortage metric and at step 1422, report server 1560 provides the exception report page with the list of items to client 1564.

After step 1422, report server 1560 can receive requests for other exception report pages at step 1418, other shortage pages at step 1414, or instructions for analyzing shortages using the primary shortage metrics and secondary shortage metrics at step 1424. If a request for instructions is received, report server 1560 provides the instructions for the primary shortage metric at step 1426.

Figure 22:
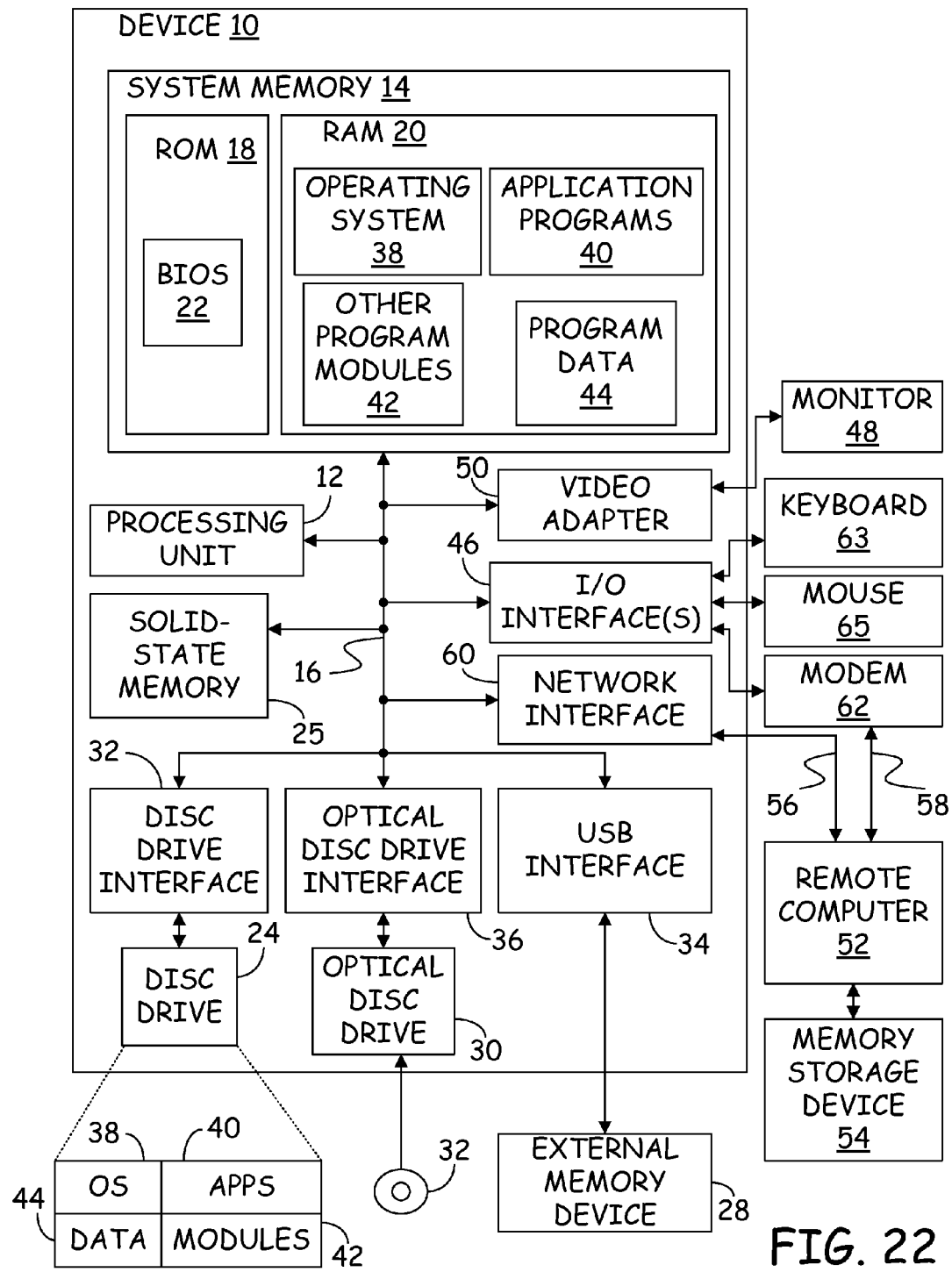
FIG. 22 provides a block diagram of a computing device that may be used as a client, server or database server.

FIG. 22 provides an example of a computing device 10 that can be used to as a client device, server device or database server device in the embodiments above. Computing device 10 includes a processing unit 12, a system memory 14 and a system bus 16 that couples the system memory 14 to the processing unit 12. System memory 14 includes read only memory (ROM) 18 and random access memory (RAM) 20. A basic input/output system 22 (BIOS), containing the basic routines that help to transfer information between elements within the computing device 10, is stored in ROM 18. Computer-executable instructions that are to be executed by processing unit 12 may be stored in random access memory 20 before being executed.

Embodiments of the present invention can be applied in the context of computer systems other than computing device 10. Other appropriate computer systems include handheld devices, multi-processor systems, various consumer electronic devices, mainframe computers, and the like. Those skilled in the art will also appreciate that embodiments can also be applied within computer systems wherein tasks are performed by remote processing devices that are linked through a communications network (e.g., communication utilizing Internet or web-based software systems). For example, program modules may be located in either local or remote memory storage devices or simultaneously in both local and remote memory storage devices. Similarly, any storage of data associated with embodiments of the present invention may be accomplished utilizing either local or remote storage devices, or simultaneously utilizing both local and remote storage devices.

Computing device 10 further includes a hard disc drive 24, an external memory device 28, and an optical disc drive 30. External memory device 28 can include an external disc drive or solid state memory that may be attached to computing device 10 through an interface such as Universal Serial Bus interface 34, which is connected to system bus 16. Optical disc drive 30 can illustratively be utilized for reading data from (or writing data to) optical media, such as a CD-ROM disc 32. Hard disc drive 24 and optical disc drive 30 are connected to the system bus 16 by a hard disc drive interface 32 and an optical disc drive interface 36, respectively. The drives and external memory devices and their associated computer-readable media provide nonvolatile storage media for the computing device 10 on which computer-executable instructions and computer-readable data structures may be stored. Other types of media that are readable by a computer may also be used in the exemplary operation environment.

A number of program modules may be stored in the drives and RAM 20, including an operating system 38, one or more application programs 40, other program modules 42 and program data 44. In particular, application programs 40 can include programs for implementing shortage report generator 1540 including seasonality compensator 1544, primary metrics distribution calculator 1546, exceptions identifier 1548, search generator 1552, and report producer 1556, for example. Program data 44 may include sales and shortage data, weekly store-department primary metric values, rules 1550, item details for exceptions 1554, instructions 1554, and reports and instructions 1562, for example.

Input devices including a keyboard 63 and a mouse 65 are connected to system bus 16 through an Input/Output interface 46 that is coupled to system bus 16. Monitor 48 is connected to the system bus 16 through a video adapter 50 and provides graphical images to users. Other peripheral output devices (e.g., speakers or printers) could also be included but have not been illustrated. In accordance with some embodiments, monitor 48 comprises a touch screen that both displays input and provides locations on the screen where the user is contacting the screen.

The computing device 10 may operate in a network environment utilizing connections to one or more remote computers, such as a remote computer 52. The remote computer 52 may be a server, a router, a peer device, or other common network node. Remote computer 52 may include many or all of the features and elements described in relation to computing device 10, although only a memory storage device 54 has been illustrated in FIG. 22. The network connections depicted in FIG. 22 include a local area network (LAN) 56 and a wide area network (WAN) 58. Such network environments are commonplace in the art.

The computing device 10 is connected to the LAN 56 through a network interface 60. The computing device 10 is also connected to WAN 58 and includes a modem 62 for establishing communications over the WAN 58. The modem 62, which may be internal or external, is connected to the system bus 16 via the I/O interface 46.

In a networked environment, program modules depicted relative to the computing device 10, or portions thereof, may be stored in the remote memory storage device 54. For example, application programs may be stored utilizing memory storage device 54. In addition, data associated with an application program, such as data stored in the databases or lists described above, may illustratively be stored within memory storage device 54. It will be appreciated that the network connections shown in FIG. 22 are exemplary and other means for establishing a communications link between the computers, such as a wireless interface communications link, may be used.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms for implementing the claims.

What is claimed is:

1. A computer-implemented method for tracking inventory in a retail enterprise comprising:
retrieving, using a processor, a list of items that have a non-zero value for a primary shortage metric wherein the primary shortage metric is determined by conducting a physical count of items in a facility of a retail enterprise and comparing the physical count of items in the facility to an expected count of items in the facility and a discrepancy exists;
applying, using a processor, a set of established rules for items in a facility when a discrepancy exists between a physical count of the items in the facility and an expected count of the items in the facility;
using a processor to identify when the primary shortage metric exceeds a predetermined threshold which triggers an exception to a rule of said set of established rules;
retrieving, using the processor, at least one secondary shortage metric value for each item in the list of items;
said at least one secondary shortage metric value is based on at least one of a total theft quantity, a total empty package quantity, a total receipt quantity difference, an aging quantity, a total sweep quantity difference, an item merge quantity, a ghosts discrepancy and a baffles discrepancy;
generating report data, using the processor, for a report that includes at least one item in the list of items and the values of the first and second shortage metrics for the item;
displaying the report data in a web browser window;
displaying a first interactive user interface, the first interactive user interface having an interactive region selection box, an interactive group selection box, an interactive district selection box and an interactive store selection box, wherein each selection box includes a pull-down menu that is populated with user selectable entries corresponding to each selection box;
displaying a second interactive user interface, the second interactive user interface having a plurality of interactive selection areas including a shortage summary area, a receiving shortage area, a reverse logistics area, a point-of-sale area, a salesfloor shortage area, a backroom shortage area, a theft shortage area and a rule exception area; wherein upon user activation of said shortage summary area the second interactive user interface is populated with a shortage summary having a shortage dollar amount table, a departments shortage table, a comments table and a commitments table; wherein upon user activation of said receiving shortage area the second interactive user interface is populated with a summary table and a rule exceptions table; wherein upon user activation of said reverse logistics shortage area the second interactive user interface is populated with a summary of shortages associated with returning products to a vendor; wherein upon user activation of said point-of-sale shortage area the second interactive user interface is populated with a summary of shortages associated with the point-of-sale system; wherein upon user activation of said salesfloor shortage area the second interactive user interface is populated with a summary of shortages associated with the salesfloor; wherein upon user activation of said backroom shortage area the second interactive user interface is populated with a summary of shortages associated with a backroom or storeroom including baffles, ghosts and item merges; wherein upon user activation of said theft shortage area the second interactive user interface is populated with a summary of shortages associated with thefts including empty packages and theft events; and, wherein upon user activation of said rule exception area the second interactive user interface is populated with a count update exception report produced in response to a user selecting a rule exception link.

2. The computer-implemented method of claim 1 wherein the at least one secondary shortage metric comprises a count of empty packages for the item found in the facility.

3. The computer-implemented method of claim 2 wherein the at least one secondary shortage metric further comprises a count of thefts of the item from the facility.

4. The computer-implemented method of claim 3 wherein the at least one secondary shortage metric further comprises total receipt quantity difference.

5. The computer-implemented method of claim 4 wherein the at least one secondary shortage metric further comprises a central return center aging quantity wherein there is a discrepancy between a number of items in a shipment from a retail store to a central return center and the items in the shipment when the shipment is received at the central return center.

6. The computer-implemented method of claim 1 wherein the at least one secondary shortage metric further comprises a ghosts metric wherein a count of items in a storeroom are less than an expected amount.

7. The computer-implemented method of claim 1 wherein the at least one secondary shortage metric further comprises a baffles metric wherein a count of items in a storeroom exceed an expected amount.

8. The computer-implemented method of claim 1 wherein seasonally compensated values of the primary shortage metric are used by a primary metrics distribution calculator to determine a distribution of numbers of standard deviations.

9. The computer-implemented method of claim 8 wherein there is a separate number of standard deviations for each facility across a retail enterprise, and each number of standard deviations represents the number of standard deviations that a primary metric value of the facility is from a mean of a plurality of primary metric values determined for the facility.

10. The computer-implemented method of claim 1 wherein the report data further comprises a description of actions to take including reviewing the at least one secondary shortage metric value to determine its relationship to the primary metric value.

11. A computer-readable medium having computer-executable instructions stored thereon that cause a processor to perform steps comprising:
using a processor to apply a set of established rules for items in a retail enterprise when a discrepancy exists between a physical count of the items in the retail enterprise and an expected count of the items in the retail enterprise so that store personnel do not need to react to each discrepancy and only need to act when the discrepancy exceeds a threshold amount determined by the set of established rules;
receiving a selection of a store that is part of the retail enterprise;
retrieving a list of items, each item in the list of items having a shortage metric value that exceeds a predetermined threshold which triggers an exception to a rule wherein the rule is based on a predetermined quantity and a predetermined period of time;
providing the list of items together with the shortage metric value of each item in the list and at least one additional shortage metric value for each item in the list;
displaying a first interactive user interface, the first interactive user interface having a plurality of interactive selection boxes, wherein each of said plurality of interactive selection boxes includes a pull-down menu that is populated with user selectable entries;
displaying a second interactive user interface, the second interactive user interface having a plurality of interactive selection areas including a shortage summary area and a rule exception area;
wherein upon user activation of said shortage summary area the second interactive user interface is populated with a shortage summary having a shortage dollar amount table; and
wherein upon user activation of said rule exception area the second interactive user interface is populated with a count update exception report produced in response to a user selecting a rule exception link.

12. The computer-readable medium of claim 11 wherein the shortage metric value comprises a count of items and the at least one additional shortage metric value comprises a count of empty packages and a count of thefts.

13. The computer-readable medium of claim 11 wherein in list of items, at least two items are in the list for having shortage metric values that contributed to respective exceptions of different rules.

14. The computer-readable medium of claim 13 wherein the different rules involve shortage metric values for different periods of time.

15. The computer-readable medium of claim 11 further comprising providing instructions for identifying the cause of shortages based on the shortage metric value and the at least one additional shortage metric value.

16. A computer-implemented method for tracking inventory in a retail enterprise comprising:
using a processor to apply a set of established rules for items in a retail enterprise when a discrepancy exists between a physical count of the items in the retail enterprise and an expected count of the items in the retail enterprise so that store personnel do not need to react to each discrepancy and only need to act when the discrepancy exceeds a threshold amount determined by the set of established rules;

receiving a request to display shortage values for a store on a computer interface wherein the shortage values are based on the discrepancy between the physical count of the items and an expected count of the items; and returning a displayable page comprising a list of items that caused a shortage rule exception to a rule of said set of established rules wherein the rules of said set of established rules are based on a predetermined shortage value threshold and an exception time period, each entry in the list of items comprising an identifier of the item, a value for a primary shortage metric that the shortage rule was based on, and a value for at least one additional shortage metric;

said at least one additional shortage metric includes any combination of the following: a total theft quantity, a total empty package quantity, a total receipt quantity difference, an aging quantity, a total sweep quantity difference, an item merge quantity, a ghosts discrepancy and a baffles discrepancy or includes all of the following: a total theft quantity, a total empty package quantity, a total receipt quantity difference, an aging quantity, a total sweep quantity difference, an item merge quantity, a ghosts discrepancy and a baffles discrepancy; and displaying a first interactive user interface, the first interactive user interface having a plurality of interactive selection boxes, wherein each of said plurality of interactive selection boxes includes a pull-down menu that is populated with user selectable entries;

displaying a second interactive user interface, the second interactive user interface having a plurality of interactive selection areas including a rule exception area; and wherein upon user activation of said rule exception area the second interactive user interface is populated with a count update exception report produced in response to a user selecting a rule exception link.

17. The computer-implemented method of claim 16 wherein returning the displayable page comprises accessing the list of items wherein the list of items was generated by first identifying the shortage rule exception based on at least one sum of values for the primary metric for all items in a department of the store and after the shortage rule exception is identified, requesting identities of items in the department and the item's respective primary shortage metric value and additional shortage metric value.

18. The computer-implemented method of claim 16 further comprising:

receiving a request to display additional shortage values for a store; and returning a displayable page comprising a second list of items that caused a second shortage rule exception for a department in the store, each entry in the list of items comprising an identifier of the item, a value for an additional shortage metric that the second shortage rule was based on, and a value for the primary metric.

19. The computer-implemented method of claim 18 wherein the second list of items comprises different items than the items in the second list.

20. The computer-implemented method of claim 19 wherein the second list of items is ordered based on a dollar value of shortage of each item in the list.

* * * * *